US009145165B2

(12) United States Patent
Yamakado et al.

(10) Patent No.: US 9,145,165 B2
(45) Date of Patent: Sep. 29, 2015

(54) DRIVE CONTROLLING APPARATUS FOR A VEHICLE

(71) Applicant: Hitachi, Ltd., Chiyoda-ku, Tokyo (JP)

(72) Inventors: Makoto Yamakado, Tsuchiura (JP); Atsushi Yokoyama, Tokyo (JP); Masato Abe, Machida (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 14/155,647

(22) Filed: Jan. 15, 2014

(65) Prior Publication Data

US 2014/0129090 A1    May 8, 2014

Related U.S. Application Data

(63) Continuation of application No. 11/828,850, filed on Jul. 26, 2007, now Pat. No. 8,744,689.

(51) Int. Cl.

| B62D 6/00 | (2006.01) |
|---|---|
| A01B 69/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |

(Continued)

(52) U.S. Cl.
CPC ............... *B62D 6/00* (2013.01); *B60W 30/045* (2013.01); *B60W 50/16* (2013.01); *B62D 15/029* (2013.01); *B60T 2201/16* (2013.01); *B60W 2520/105* (2013.01)

(58) Field of Classification Search
CPC ..... B62D 60/00; B62D 15/029; B60W 50/16; B60W 30/045; B60W 2520/105; B60T 2201/16

See application file for complete search history.

(56) References Cited

U.S. PATENT DOCUMENTS 5,267,629 A * 12/1993 Mouri .......................... 180/415
5,895,433 A    4/1999 Chen et al.
(Continued)

FOREIGN PATENT DOCUMENTS

JP         7-2130        1/1995
JP         11-334627     12/1999
(Continued)

OTHER PUBLICATIONS

Y. Shibahata et al., "Improvement of Vehicle Maneuverability by Direct Yaw Moment Control", vol. 47, No. 12 (1993), pp. 54-60.
(Continued)

*Primary Examiner* — Nicholas Kiswanto
(74) *Attorney, Agent, or Firm* — Crowell & Moring LLP

(57) ABSTRACT

A vehicle motion control system is capable of defining clear guidelines on more specific control timing associated with accelerating, steering, and braking operations, and conducting motion control based on the defined guidelines. An ideal motion control unit within a central controller uses longitudinal jerk information of a vehicle to control the steering of the vehicle. Information for determining the initiation timing of steering is presented from a human-vehicle interface (HVI) to a driver. In accordance with the information presented from the HVI, the driver controls the initiation timing of steering.

4 Claims, 28 Drawing Sheets

(51) Int. Cl.
  *G06F 19/00* (2011.01)
  *B60W 30/045* (2012.01)
  *B60W 50/16* (2012.01)
  *B62D 15/02* (2006.01)

(56) References Cited

U.S. PATENT DOCUMENTS

| | | | |
|---|---|---|---|
| 6,097,999 | A | 8/2000 | Shal et al. |
| 6,302,441 | B1 | 10/2001 | Kawamuro et al. |
| 6,392,535 | B1 | 5/2002 | Matsuno et al. |
| 6,498,976 | B1 | 12/2002 | Ehlbeck et al. |
| 6,622,073 | B2 | 9/2003 | Tanaka et al. |
| 7,400,963 | B2 | 7/2008 | Lee et al. |
| 7,562,948 | B2 | 7/2009 | Matsumoto et al. |
| 7,628,241 | B2 | 12/2009 | Miura |
| 7,979,180 | B2 * | 7/2011 | Yamakado et al. ............ 701/38 |
| 8,078,381 | B2 | 12/2011 | Yamakado et al. |
| 8,112,200 | B2 | 2/2012 | Yamakado et al. |
| 2002/0139599 | A1 | 10/2002 | Lu et al. |
| 2004/0024505 | A1 | 2/2004 | Salib et al. |
| 2004/0083043 | A1 | 4/2004 | Akiyama et al. |
| 2006/0069489 | A1 | 3/2006 | Chen et al. |
| 2007/0106445 | A1 | 5/2007 | Suzuki et al. |
| 2007/0162202 | A1 | 7/2007 | Moshchuk et al. |
| 2007/0219700 | A1 | 9/2007 | Makiyama |
| 2009/0102145 | A1 | 4/2009 | Moriki et al. |

FOREIGN PATENT DOCUMENTS

| | | |
|---|---|---|
| JP | 2005-186831 A | 7/2005 |
| JP | 3733929 B2 | 10/2006 |
| JP | 2009262700 A | 11/2009 |

OTHER PUBLICATIONS

Y. Shibahata et al., "The Improvement of Vehicle Maneuverability by Direct Yaw Moment Control", AVEC '92 (Sep. 1992), pp. 452-457.

T. Flash et al., "The Coordination of Arm Movements—An Experimentally Confirmed Mathematical Model", Massachusetts Institute of Technology, Artificial Intelligence Laboratory and Center for Biological Information Processing Whitaker College, A.I. Memo 786, C.B.I.P. Paper 010, Nov. 1984, pp. 1-31.

M. Yamakado et al., "Examination of Voluntary Driving Operational Timing by Using Information Obtained with the Developed Jerk Sensor", F2006V137T.

Japanese language Office Action dated Jan. 25, 2013 (3 pages).

* cited by examiner

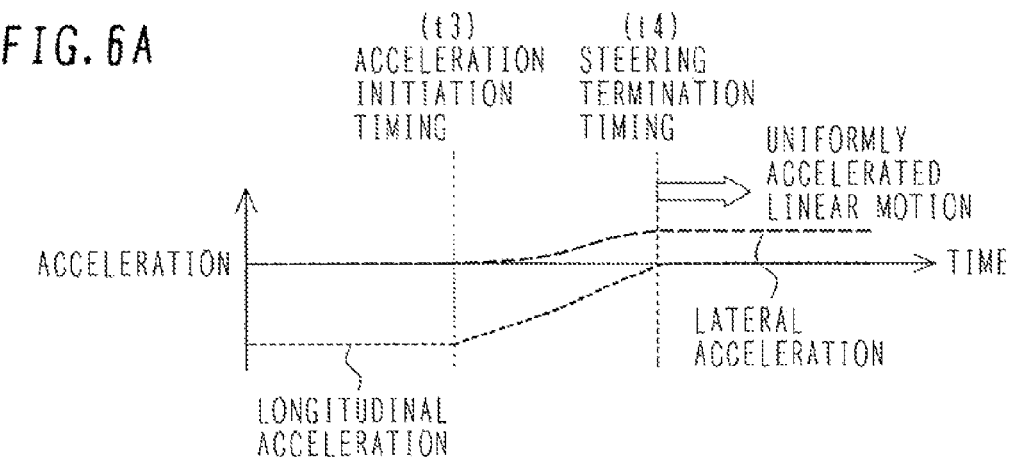
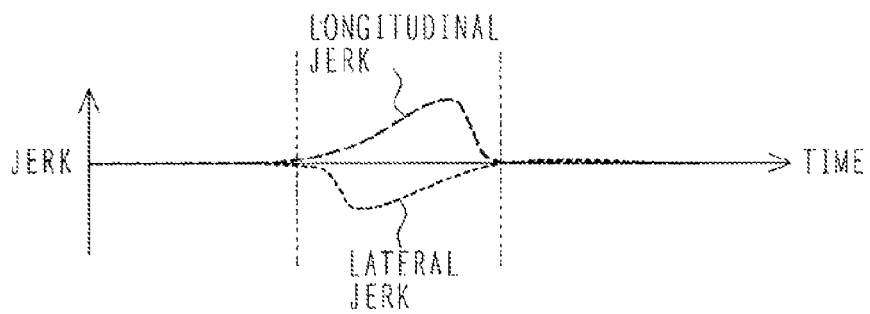
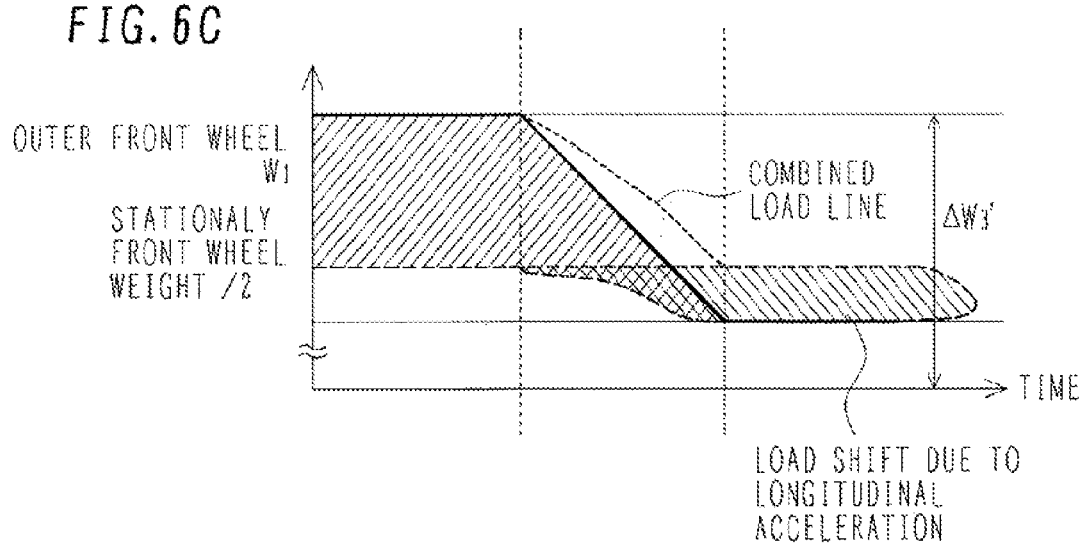

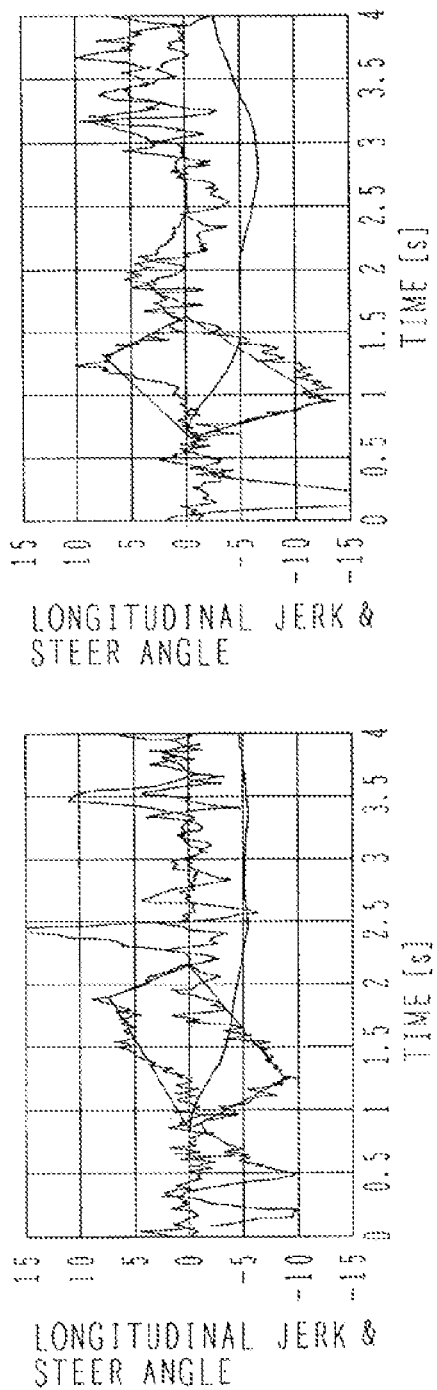
FIG.10F
FIG.10E
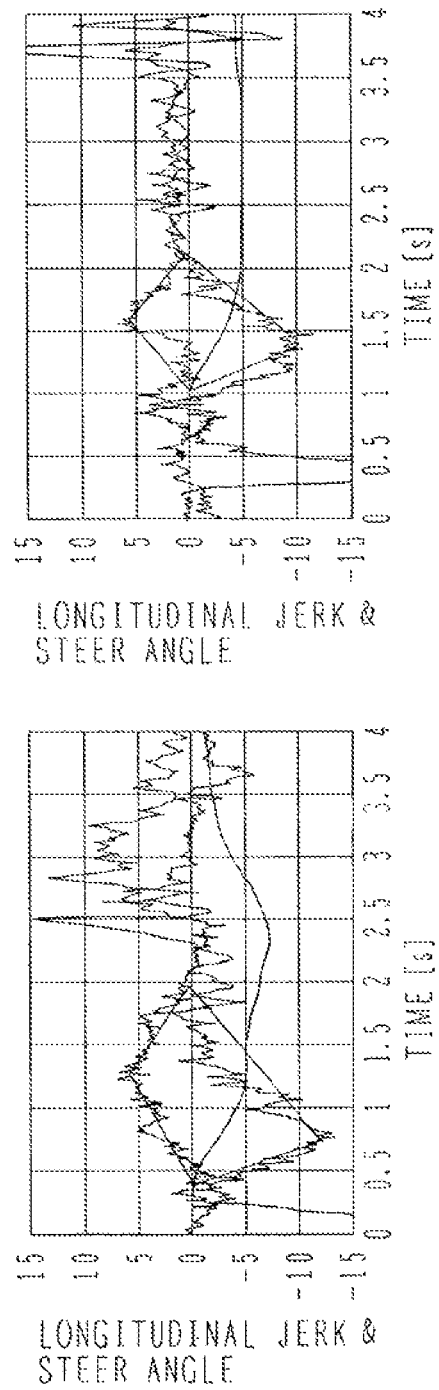
FIG.10H
FIG.10G

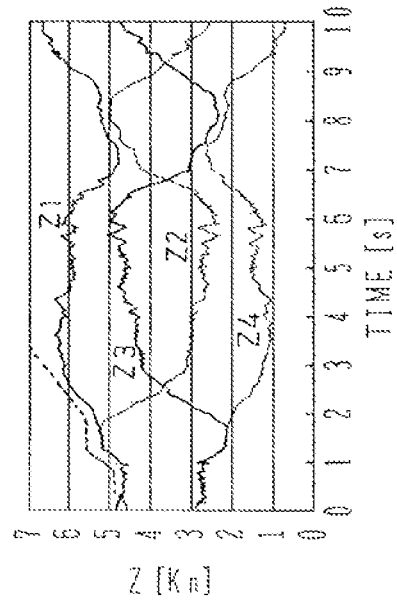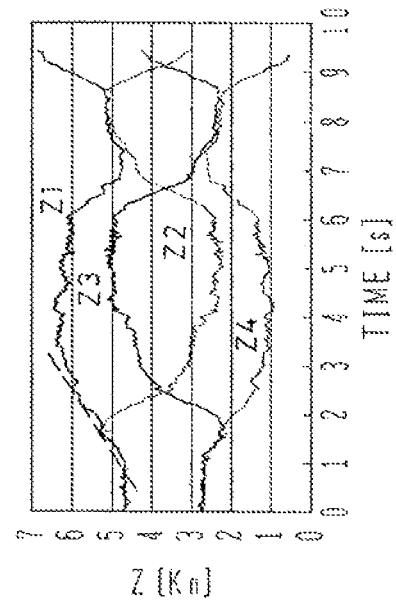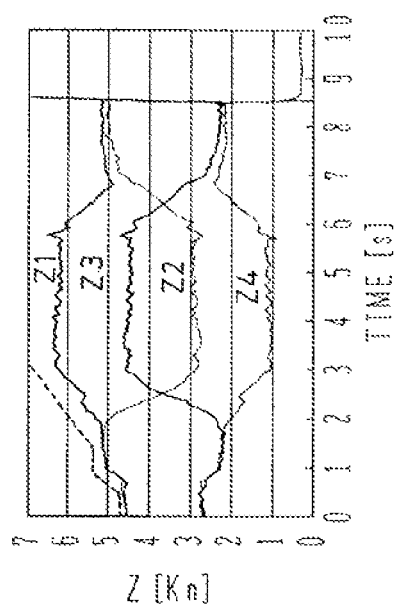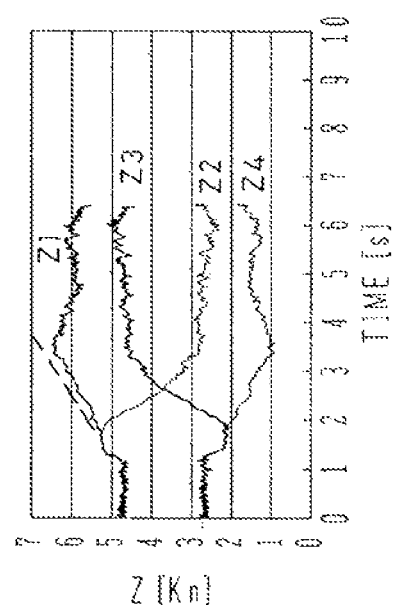

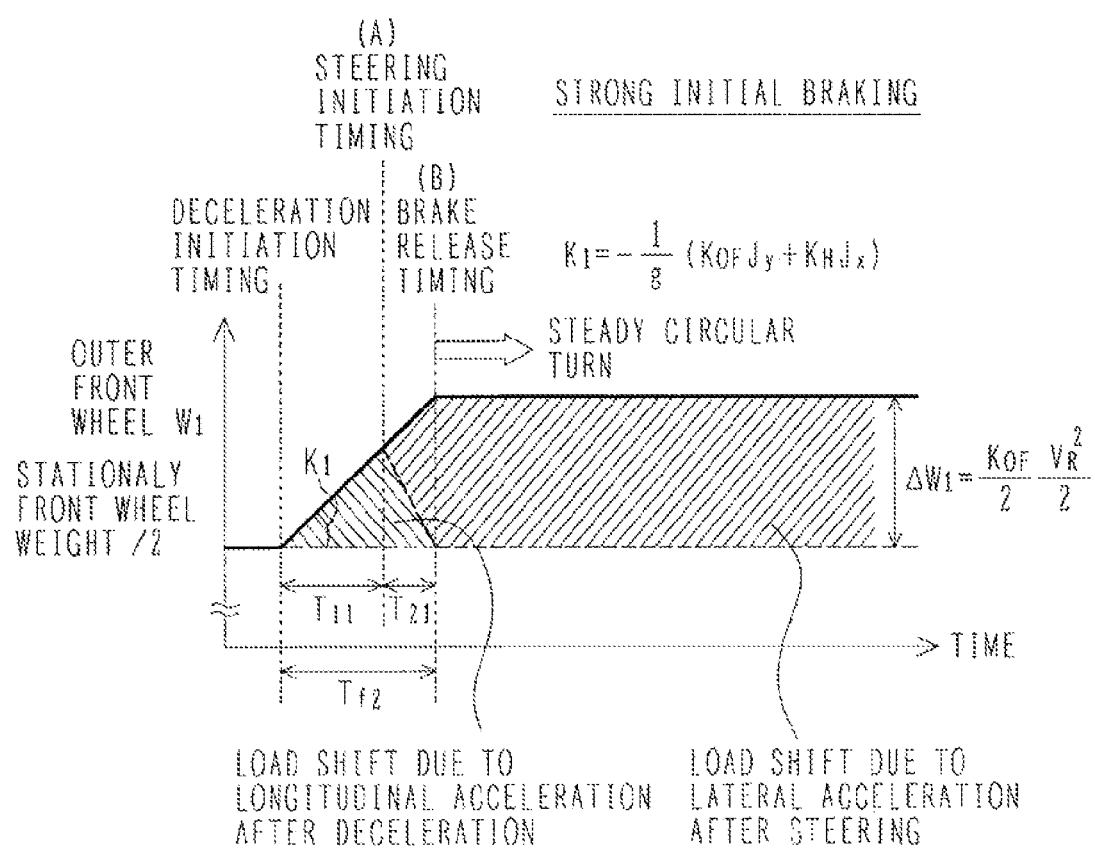

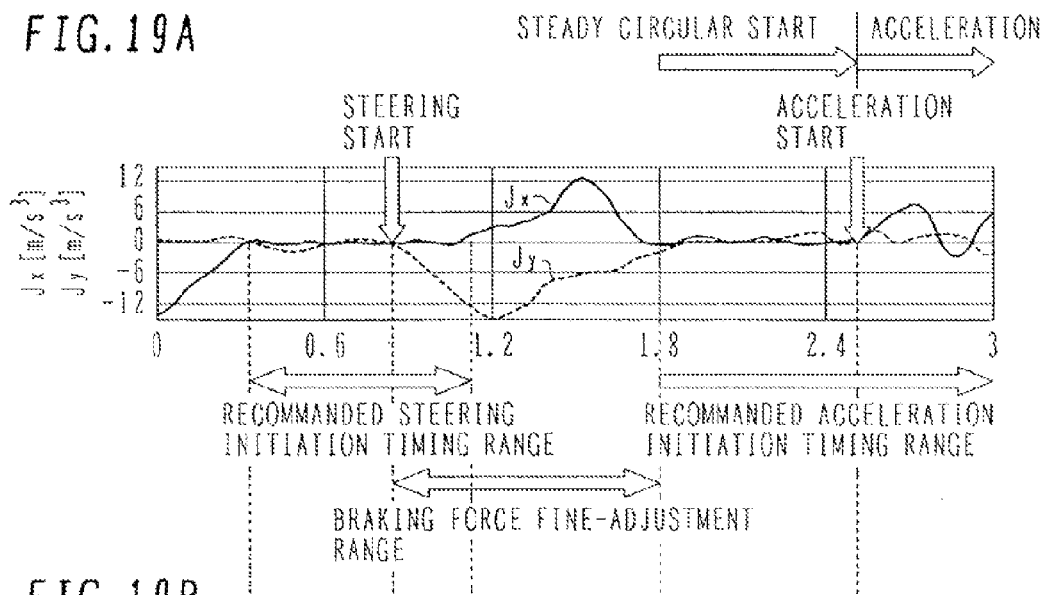
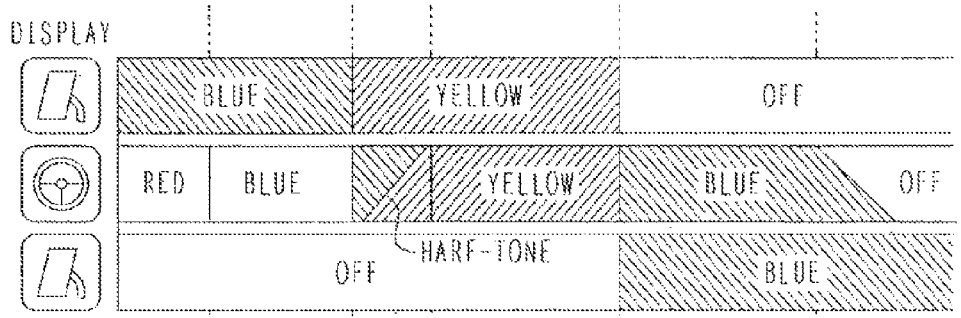
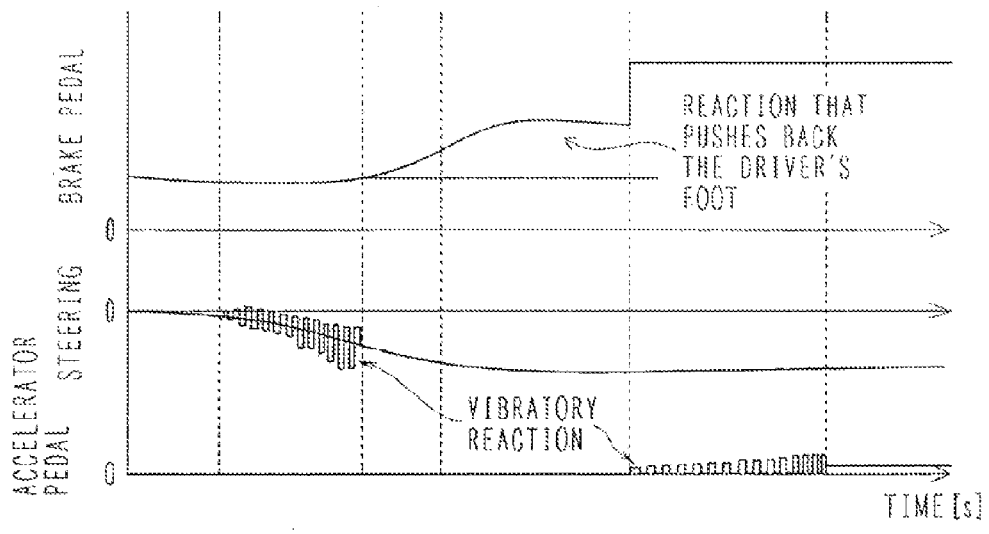

DRIVE CONTROLLING APPARATUS FOR A VEHICLE

This application is a continuation of U.S. patent application Ser. No. 11/828,850, filed Jul. 26, 2007, the entire disclosure of which is incorporated herein by reference, which corresponds to prior Japanese application 2006-123354, filed Apr. 27, 2006.

BACKGROUND OF THE INVENTION

1. Field of the Invention

The present invention relates to a vehicle motion control system designed to integratedly control steering, deceleration, and acceleration. More particularly, the invention concerns a vehicle motion control system, intended to conduct vehicle motion control based on vehicle jerk information.

2. Description of the Related Art

For a conventional type of vehicle, components from a steering wheel to a steering gear that actually transmits a steering force to tires, from an accelerator pedal to an engine throttle valve, and from a brake pedal to a brake hydraulic unit, have been directly connected via a mechanical linkage that includes hydraulics. In contrary to this conventional scheme, various types of by-wire systems have been proposed that dispense with the above mechanical linkage by detecting the input levels of the vehicle driver to the respective operating units via sensors and converting the detected input levels into electrical signals before transmitting each of the signals. In the by-wire systems, not only the input levels of the driver, but also control commands assigned to compensate for any excesses or shortages of the input levels can be transmitted to the steering gear, the engine, and the brake hydraulic unit, and the appropriate motion control of the vehicle can be conducted without being governed by the input levels. These systems designed so that each can independently control steering, acceleration (driving), and deceleration (braking), are likely to achieve higher wheel performance by integrating the respective functions.

In a known example of such an integrated vehicle control system (refer to, for example, Patent Document 1), a processing unit uses the ambient environmental information and operating requests of a vehicle to calculate information on control targets for operating the actuators associated with control units, and calculates the information intended to assign a driving force and a braking force to each control unit. The latter information intended to assign a driving force and a braking force is based on the information relating to the calculated control targets (See JP-A-2005-186831).

SUMMARY OF THE INVENTION

JP-A-2005-186831 and other documents proposing the integrated vehicle control system discussed above disclose a "framework" that includes a software configuration designed for integrated control. The "framework" disclosed in these documents, however, is not of such a nature as to clearly indicate that the framework utilizes the advantage of a by-wire system that the appropriate motion control of the vehicle can be conducted without being governed by input levels of the vehicle driver.

Meanwhile, the driver's intent or request is the ideal vehicle motion itself indicating that the driver wants to drive smoothly at a certain corner or to avoid the front vehicle that abruptly stops. Steering through 60 degrees, for example, is only the method or process of implementing the particular conduct, and the amount of manipulating the steering wheel is not the driver's intent itself. Additionally, even if the requested vehicle motion that is the driver's intent itself is the same, operations will naturally differ according to the particular driving ability of the driver, and the motion implemented will consequently differ. In extreme examples such as avoidance of danger, even when the preparations required for the vehicle to operate faithfully to an input group of driving operations are made in the system, if the driver is unskilled in the driving operations, he or she may be at a loss in what timing to combine operations inputs. If this is the case, the input group of driving operations may become inappropriate and the requested vehicle motion such as avoidance is likely to be unrealizable. In addition, when automatic driving is assumed, the driver's intent will only be information on the traveling location and the vehicle will autonomously travel using external information supplied from a navigation system or the like. At this time, the need will arise to consider, for example, in what timing to start the braking and steering operations when turning at corners, and in what timing to accelerate the vehicle.

A first object of the present invention is to provide a vehicle motion control system capable of defining clear guidelines on more specific control timing associated with accelerating, steering, and braking operations, and conducting motion control based on the defined guidelines.

A second object of the present invention is to provide a vehicle motion control system that presents detailed control guidelines simultaneously with the above guidelines to a driver and thus to allow the driver to obtain guidelines with respect to his or her own driving operations.

(1) In order to fulfill the foregoing first object, the present invention has, in a vehicle motion control system having a device that controls vehicle steering, means for controlling the steering, acceleration, or deceleration of a vehicle by using at least longitudinal jerk information thereof.

Such construction makes it possible for the motion control system to define clear guidelines on more specific control timing associated with accelerating, steering, and braking operations, and to conduct motion control based on the defined guidelines.

(2) In order to fulfill the foregoing first object, the present invention includes means that presents information useful for a driver to determine initiation timing of steering, and is adapted such that the information presented from the information presentation means is used for the driver to control the initiation timing of steering.

Such construction allows the driver to obtain guidelines with respect to his or her own driving operations.

According to the present invention, it is possible to define clear guidelines on more specific control timing associated with accelerating, steering, and braking operations, and to conduct motion control based on the defined guidelines.

Since more specific control guidelines are presented simultaneously with the above guidelines to the driver, it is also possible for the driver to obtain guidelines with respect to his or her own driving operations.

BRIEF DESCRIPTION OF THE DRAWINGS

FIGS. 6A to 6E are explanatory diagrams of the state variables relating to the vehicle in the present invention when the vehicle changes from turning state (6) to a linear motion while accelerating.

FIGS. 10A to 10H are explanatory diagrams of data extraction results on completion timing of brake loosening and on initiation timing of acceleration, as results of both tests I and II in the present embodiment.

FIGS. 11A to 11H are explanatory diagrams of analytical results on vertical loads of each wheel, as results of both tests I and II in the present embodiment.

FIGS. 17A to 17C are explanatory diagrams of control in driver mode by the vehicle motion control system according to the present embodiment.

FIGS. 19A to 19C are timing charts of the driver assistance control that is "indirect control" in the vehicle motion control system according to the present embodiment.

DESCRIPTION OF THE PREFERRED EMBODIMENTS

First, based on theoretical studies and experimental results, a concept of vehicle motion control which forms a core of the present invention will be described hereunder using FIGS. 1 to 13. Clear guidelines on more specific control timing associated with accelerating, steering, and braking operations will also be defined hereunder.

As discussed earlier herein, automobiles need to move with respect to a road surface until each automobile has received the force occurring, and by using this force, the automobile can freely move in a plane under an intent of a driver present in the vehicle. Important here is that a motion to be implemented under the driver's intent depends not only on driving operations information entered by the driver, but also on a speed of the vehicle, longitudinal acceleration thereof, lateral acceleration, an angle of side slipping, a tread load of tires, and other kinetic states. For example, input of a steering angle in the timing that the tires are unloaded (in an extreme case, when the tires move away from the road surface) does not generate a great lateral force, and brake input naturally does not generate a significant deceleration force, either. Additionally, under a so-called "countersteering state", the vehicle could drift to the left, in spite of a rightward steering angle being given. As can be seen from these, unless the kinetic states of the vehicle, timing relative to driving operations, and the entered operations information are appropriate, the motion of the vehicle could even differ from the driver's intent.

Figure 1:
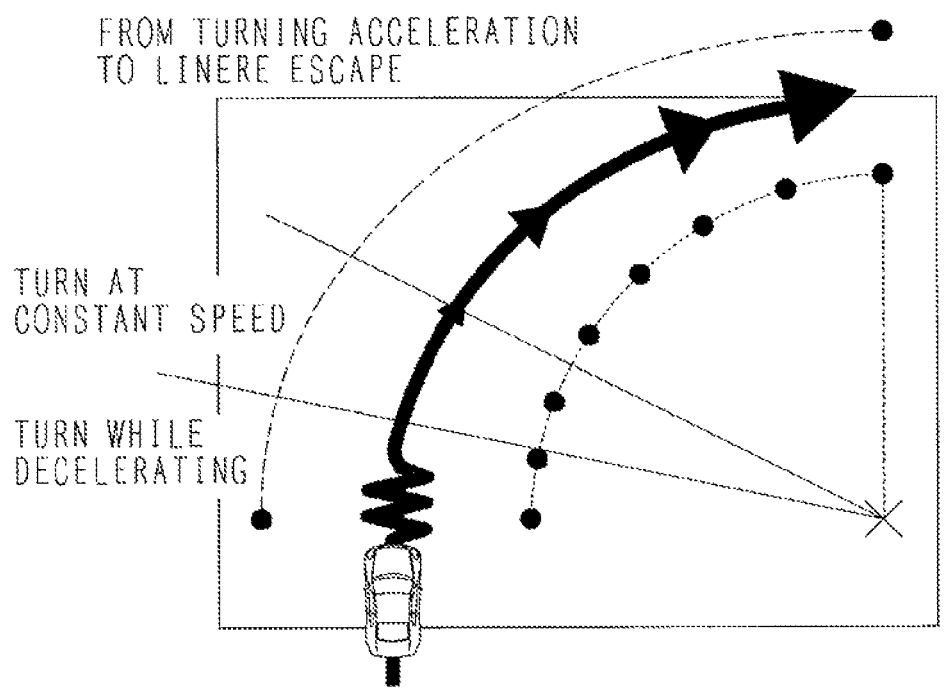
FIG. 1 is an explanatory diagram of the driving operation and vehicle motion studied in the present invention.

The motion that the driver intends is difficult to quantitatively handle, because ambient environmental factors occupy a great rate. Qualitative analysis of the intended motion, however, is possible, only if attention is focused only on parking operation and other normal conditions, except for a state in which positional control accuracy is extremely high. Examples of these states include a situation under which a "smoother motion" can be obtained without significant acceleration or deceleration. These states can also be expressed as "efficient use of the tire force" and "unwasteful driving operations" (in the present invention, these kinetic and driving states are collectively called an "ideal motion" or "ideal driving"). The driving operations and vehicle motion studied in the present invention are first described below using FIG. 1. FIG. 1 is an explanatory diagram of the driving operations and vehicle motion studied in the present invention.

As shown in FIG. 1, the driving operations and vehicle motion studied in the present invention relate to a basic situation of "approaching a curve at reduced vehicle speed, then after turning at a constant vehicle speed, and leaving the corner linearly by accelerating the vehicle during the turn". Guidelines relating to brake pedal, steering wheel, and accelerator pedal control operations for achieving the above situation are described below. Also, the tire characteristics, load shift physical model, vehicle kinetic studies, and support experimental results involved to substantiate the above-mentioned guidelines are described in order.

(Method of Using the Tire Force Efficiently According to Particular Kinetic Conditions: Vehicle Kinetic Approach)

Forces that the tires generate can be classified into the tire deformation forces occurring in an adhesion region, and frictional forces in a slipping region. Using the tires efficiently can be looked upon as increasing a unit side slipping angle or increasing a lateral force or longitudinal force (gain) relative to a slipping ratio, as increasing response characteristics of the force occurring (i.e., reducing a phase lag), and even as reducing tire wear. In addition, a high gain indicates that the steering angle, a brake pedaling force, and/or other operating variables needed to generate the same tire force do not need to be great, which, in turn, leads directly to "unwasteful driving operations".

Figure 2:
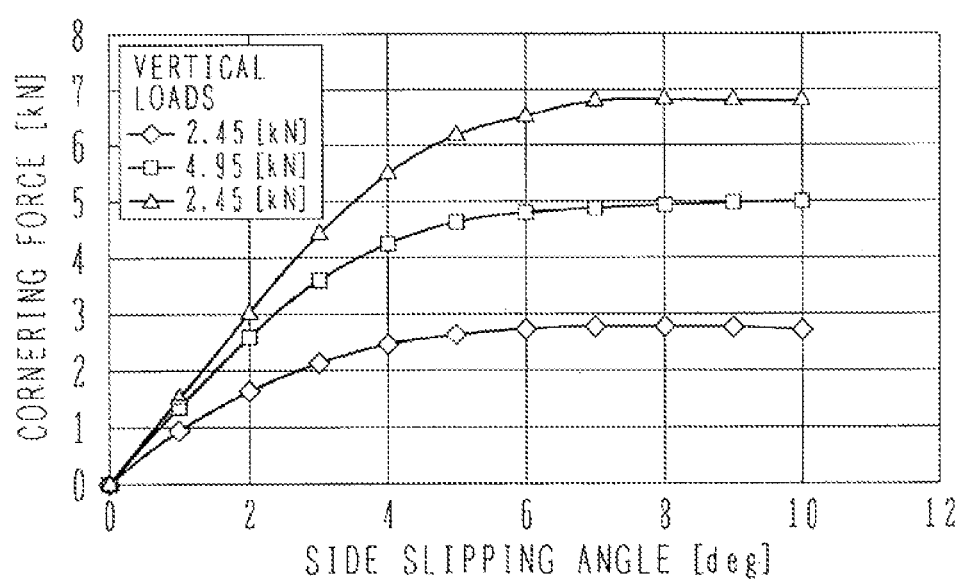
FIG. 2 is an explanatory diagram of side slipping angle (deg)–cornering force (kN) relationships classified by different vertical loads in the present invention.

FIG. 2 is an explanatory diagram of side slipping angle (deg)–cornering force (kN) relationships classified by different vertical loads.

As shown in FIG. 2, to increase the tire gain, it is important to increase ground pressure of the tire tread, and it is necessary to increase the vertical load applied to the tires.

Also, response characteristics are considered to represent the time required for tread rubber to reach a desired steady-state deformation level from a current deformation level. Accordingly, it is important to form such a hysteresis as to lead directly to the desired steady-state deformation level without causing unnecessary deformation (i.e., without creating a detour). For example, if the tread of the tire under a certain vertical load becomes unloaded during deformation in a desired direction, the tread will return to its original state, thus causing a delay in the generation of a force. There is a need, therefore, to reduce the change in force, such as noise, that leads to the generation of a steady force. A change point, in particular, from the above-mentioned adhesion region to the slipping region, changes according to a ground pressure level of the tread. Thus, the deformation form of the tire tread rubber also changes significantly. Therefore, a change rate of the vertical load needs to be reduced.

Additionally, in consideration of reducing tire resistance and tire wear, it is desirable that the adhesion region be enlarged. It is also desirable that the tires be used in the range that increases the vertical load and reduces the side slipping angle and the slipping ratio.

Putting the above together, one can see that the tread load must be increased and the change rate reduced to generate the tire force more effectively.

A method of using the tires of the moving vehicle more effectively with a knowledge of the above independent tire characteristics will now be described.

The tread load can be divided into a fixed section (stationary wheel weight) determined by weight allocation, and a load shift section proportional to the inertial force generated by longitudinal or lateral acceleration or deceleration.

A load shift analytical model is described below using FIG. 3.

Figure 3:
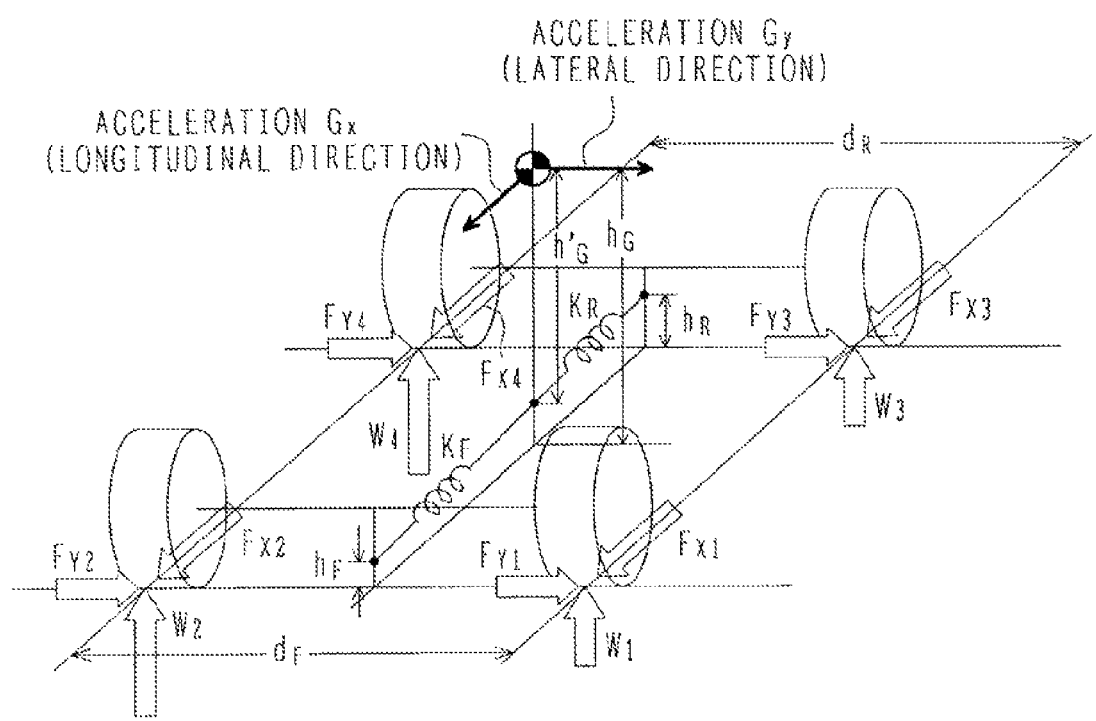
FIG. 3 is an explanatory diagram of an analytical model for load shifts in the present invention.

FIG. 3 is an explanatory diagram of the load shift analytical model.

FIG. 3 is a representation of the analytical model for the load shifts reported on the paper "Improvement of Vehicle Maneuverability by Direct Yaw Moment Control" presented by Shibahata et al. on the journal of the Automotive Engineers of Japan, Vol. 47, No. 12 (1993), pp. 54-60. The load shifts are shown in FIG. 10.

On the basis of the analytical mode, basic effects caused by load shifts are examined below. Loads W1 to W4 applied to four wheels by acceleration or deceleration during cornering can be represented using expressions (1) to (4). Longitudinal and lateral shifts of the central point of gravity due to the sine components of a rolling angle and a pitching angle are ignored in these expressions.

$$W_1 = \frac{W_F}{2} - K_{OF}\frac{G_y}{g} - K_H\frac{G_x}{g} \quad (1)$$

$$W_2 = \frac{W_F}{2} + K_{OF}\frac{G_y}{g} - K_H\frac{G_x}{g} \quad (2)$$

$$W_3 = \frac{W_R}{2} - K_{OR}\frac{G_y}{g} + K_H\frac{G_x}{g} \quad (3)$$

$$W_4 = \frac{W_R}{2} + K_{OR}\frac{G_y}{g} + K_H\frac{G_x}{g} \quad (4)$$

Coefficients KOF, KOR, and KH in the above expressions can be rewritten as follows using expressions (5), (6), and (7), respectively.

$$K_{OF} = \frac{W_F^* \cdot h_G^* \cdot W + h_F \cdot W_F}{d_F} \quad (5)$$

$$K_{OR} = \frac{K_R^* \cdot h_G^* \cdot W + h_R \cdot W_R}{d_R} \quad (6)$$

$$K_H = \frac{1}{2}\frac{h_G}{l}W \quad (7)$$

Sections KF and KR in the above denote rolling rigidity of the front and rear wheels, and K*F and K*R denote rolling rigidity allocations of the front and rear wheels. The rolling rigidity distributions K*F and K*R of the front and rear wheels can be represented using following expressions (8) and (9), respectively.

$$K_F^* = \frac{K_F}{K_F + K_R} \quad (8)$$

$$K_R^* = \frac{K_R}{K_F + K_R} \quad (9)$$

Section "hG" in expression (5) denotes the height of the gravitational center, and "h*G" denotes a distance between the center of gravity and a rolling axis. A relationship between the height of the gravitational center ("hG") and the distance between the center of gravity and the rolling axis ("h*G") can be represented as follows using expression (10):

$$h_G^* = h_G - \frac{h_F \cdot W_F + h_R \cdot W_R}{W} \quad (10)$$

where dF and dR denote the treads of the front and rear wheels, WF and WR denote the loads of the front and rear wheels, and Gx and Gy denote longitudinal acceleration and lateral acceleration of the vehicle.

Additionally, change rates of each wheel load per unit time can be represented as follows using expressions (11) to (14).

$$\frac{dW_1}{dt} = -K_{OF}\frac{J_y}{g} - K_H\frac{J_x}{g} \quad (11)$$

$$\frac{dW_2}{dt} = +K_{OF}\frac{J_y}{g} - K_H\frac{J_x}{g} \quad (12)$$

$$\frac{dW_3}{dt} = -K_{OR}\frac{J_y}{g} + K_H\frac{J_x}{g} \quad (13)$$

$$\frac{dW_4}{dt} = +K_{OR}\frac{J_y}{g} + K_H\frac{J_x}{g} \quad (14)$$

The above indicates that changes in the loads of each wheel can be expressed by linear coupling between longitudinal jerk (Jx) and lateral jerk (Jy). "Smoother motion" can also be expressed as a "motion without significant jerk", and this "smoother motion" has a close relationship with a "motion without significant changes in load".

The longitudinal vehicle acceleration (longitudinal jerk) and lateral vehicle acceleration (lateral jerk) here are state quantities that indicate the vehicle motion generated by the tire force. These state quantities determine the vertical loads of the tires and hence, the tire force. Compatibility between the "vertical load W or Fz" and the "tire force (Fx, Fy) for achieving the motion" must therefore be considered to control the motion.

For example, when the vehicle abruptly decelerates, each of the front and rear wheels undergoes a perpendicular force (−Fxf or −Fxr) in a direction of the deceleration. For the front wheels, as the perpendicular force (−Fxf) increases, longitudinal deceleration will increase and thus the vertical load will also increase. For the rear wheels, however, as the perpendicular force (−Fxr) increases, longitudinal deceleration will increase, but the vertical load will decrease. For an abrupt turn, the vertical loads of the outer tires increase with increases in lateral force, whereas the vertical loads of the inner tires decrease with increases in lateral force.

Increases in vertical load with increases in force cause the gain to rise with operations, so this means that minimum and unwasteful driving operations are possible and thus that the tires are used more effectively. However, since the tires are installed on one vehicle, always using the four tires efficiently under all driving conditions is impossible in a normal two-wheel steering, two-wheel drive type of vehicle. The present invention is targeted for the normal type of vehicle. The "smoother motion", "using the tire force efficiently", and "unwasteful driving operations", that is, in a word, "ideal motion", within a range of these factors' feasibility based on driving operations such as acceleration, braking, and steering, will be described hereunder.

An operating sequence of the driver from deceleration to turning and linear acceleration is outlined in items (1) to (6) below.

(1) When the driver approaches a corner, he or she determines an approaching speed (Vc) from an assumed rotational radius considering an estimated cornering centrifugal force.
(2) If a current speed (Vp) is higher than Vc, the driver decelerates down the vehicle by applying brakes.
(3) The driver initiates steering in certain timing during the deceleration.

The deceleration causes load shifts from the rear wheels to the front wheels, thus increasing the tread loads of the front wheels, and reducing the loads of the rear wheels. When steering is started, the front-wheel lateral force that works as positive yaw moment for the turn is generated efficiently and significantly. A potential that generates the rear-wheel lateral force that works as negative yaw moment (a stopping direction of yaw) is reduced.

(4) The driver increases a steering angle while loosening the brakes.

Operation (4) is considered to be a braking-force reducing operation for changing the vehicle state to a steady circular turn while performing adjustments to prevent the yaw moment from becoming excessive.

(5) The driver conducts the steady circular turn at a constant steering angle

In this state, the most stable behavior of the vehicle can be obtained during turning.

(6) The driver changes the vehicle state from the turning motion to a linear motion by accelerating.

Operation (6) reduces the front-wheel lateral force. In addition, this operation generates positive load shifts to the rear wheels by the accelerating operation, increases the rear-wheel lateral force, and generates negative moment relative to the moment generated under an equilibrium state (steady circular turn). Thus, operation (6) is considered to be a braking-force reducing operation for terminating the turn and changing the vehicle state to the linear traveling motion.

Above items (3), (4), (6) are operations during which the decelerating, steering, and accelerating operations progressively advance, and timely implementation of these operations is an object of the present invention.

When one considers optimal timing with the foregoing "effective generation of the tire force" kept in mind, it is considered that after the acceleration has been started, when the deceleration and the loads of the front wheels each become a maximum and the loads of the rear wheels become a minimum, steering is started as operation (3). Expressions (1) to (4) and (11) to (14) indicate that it is optimal to start steering in the timing when the longitudinal jerk decreases to zero. Of course, the optimal timing is difficult to be identified, since a disturbance is caused by various factors such as road surface roughness. It is considered, however, that the optimal timing is when the longitudinal jerk decreases to essentially zero. In addition, if a high braking pressure is constantly maintained, this will be equivalent to the fact that steering is initiated in desired timing during the particular period of time, since the jerk will remain zero for this period. As can be seen from this, jerk information for identifying a maximum longitudinal acceleration value is required for the determination of the steering initiation timing.

In order to study the braking-force reducing operation for loosening the brakes after the initiation of steering in step (4), the following first describes cornering that does not involve deceleration, and then describes a situation under which the vehicle is further decelerated.

A front-and-rear two-wheel model assuming a motion of a four-wheel vehicle in terms of front-and-rear two-wheel equivalent planar vehicle motion is described below using FIG. 4.

Figure 4:
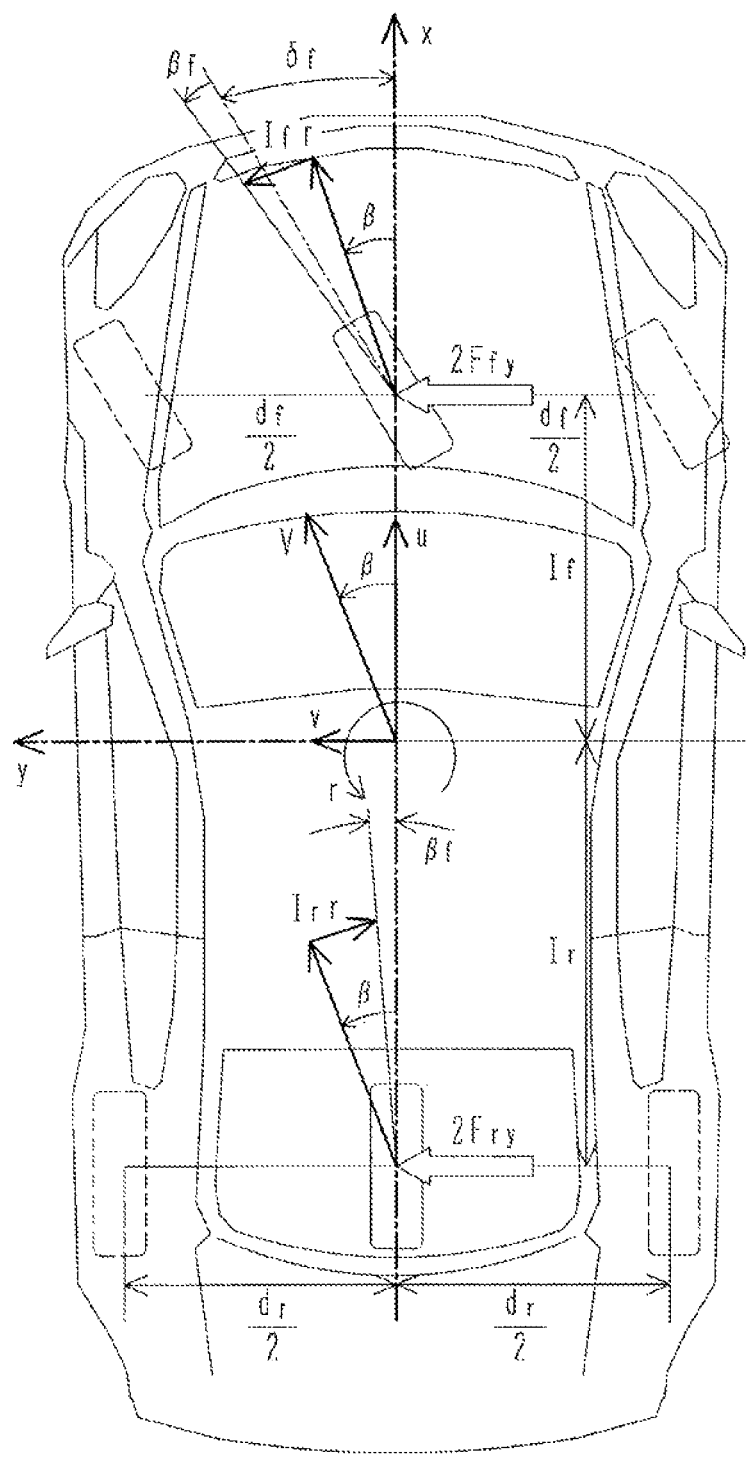
FIG. 4 is an explanatory diagram of a front-and-rear two-wheel model assuming a motion of a four-wheel vehicle in the present invention in terms of front-and-rear two-wheel equivalent planar vehicle motion.

FIG. 4 is an explanatory diagram of the front-and-rear two-wheel model assuming the motion of the four-wheel vehicle in terms of front-and-rear two-wheel equivalent planar vehicle motion.

A motion of the front-and-rear two-wheel model can be represented as follows using expressions (15) and (16).

$$mG_y = mV\left(\frac{d\beta}{dt} + \gamma\right) = 2F_{fy} + 2F_{ry} \qquad (15)$$

$$I = \frac{dr}{dt} = 2l_f F_{fy} - 2l_r F_{ry} \qquad (16)$$

In the above expressions, "m" is a mass of the vehicle, Gy is a lateral acceleration thereof, and V is a velocity thereof. Also, β is a side slipping angle thereof, Yf is a lateral force of the front wheel, and Yr is a lateral force of the rear wheel. In addition, Iz is inertial moment of yawing, "r" is a yaw rate, lf is a distance between a central point of gravity of the vehicle and the front wheel, and lr is a distance between the central point of gravity of the vehicle and the rear wheel.

When steering is started, a side slipping angle occurs for a front tire, which then generates a lateral force and initiates a rotating motion (yaw response) around the central point of gravity of the vehicle. Thus, a side slipping angle of the vehicle body with respect to a traveling direction thereof occurs, which then causes a rear tire to generate a lateral force and results in the front and rear wheels generating a centripetal force to start a turn of the vehicle. When the front and rear tires both assume a steady lateral force level and constant lateral acceleration is reached, the vehicle enters the most stable state termed the steady circular turn described as operation (5). During the steady circular turn, the side slipping angle at the central point of gravity is invariant. The yaw rate is also constant. As can be seen from expression (16), negative yawing moment that can be represented as a product obtained by multiplying the lateral force of the rear wheel and the distance from the central point of gravity to an axis of the rear wheel stops a yawing motion thereof.

As evident from expressions (1) to (4), under the vehicle state with applied deceleration, the loads of the front wheels are large and the loads of the rear wheels recover with decreases in the deceleration. A further increase in the lateral acceleration increases the vertical loads of the outer tires. Combining these situations allows one to see that the vehicle goes through:

(i) Increases in the front-wheel loads (decreases in the rear-wheel loads) due to the deceleration,
(ii) increases in the outer-wheel cornering loads (decreases in the inner-wheel loads) due to the lateral acceleration, and
(iii) recovery of the rear-wheel loads (decreases in the front-wheel loads) due to decreases in the deceleration. After these events, a steady circular turn is reached. The ideal motion that brings about "smoother driving" and "more efficient use of the tires" at this time is considered below with attention focused on the outer tires of the vehicle during the turn. In order to consider above events (i) and (ii), considerations are first performed on the outer front wheel of the vehicle during a turn. When the rightward turn shown in FIG. 1 is assumed, the left front wheel shown with an index 1 in FIG. 3 is the outer front wheel of the turning vehicle. Major work that the left front wheel is to perform between events (i) and (ii) is to start the rotating motion (yaw response). For this purpose, FY1 is generated "effectively" (even though in a minus direction of FIG. 3).

Next, state variables relating to the vehicle during a change from deceleration to a turn are described below using FIGS. 5A to 5E.

FIGS. 5A to 5E are explanatory diagrams of the state variables relating to the vehicle during a change from deceleration to a turn.

Figure 5A:
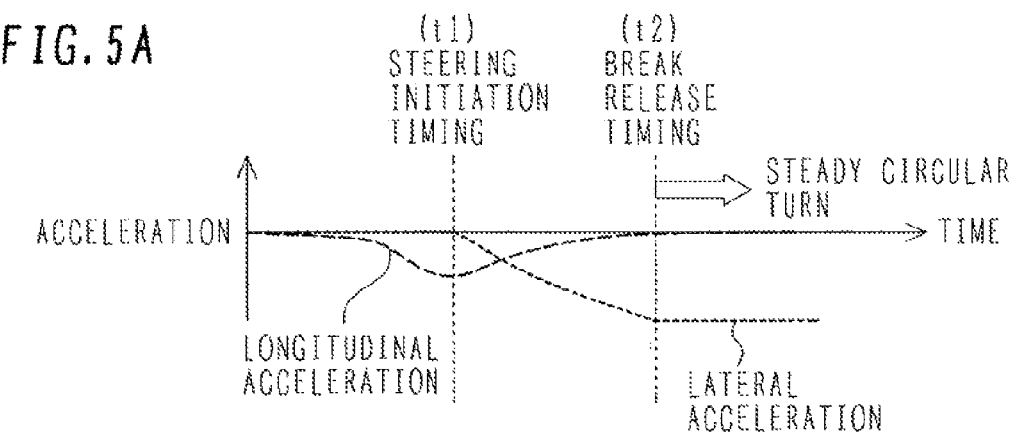
FIGS. 5A to 5E are explanatory diagrams of state variables relating to the vehicle in the present invention during a change from deceleration to a turn.
Figure 5B:
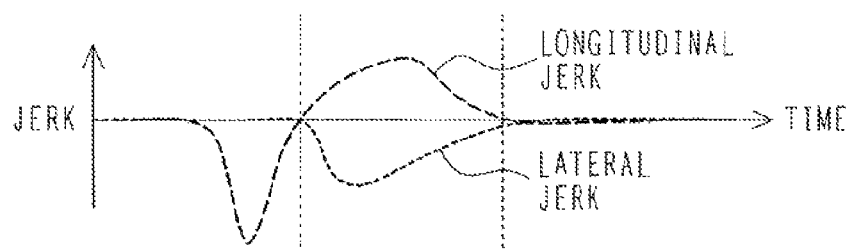
Figure 5C:
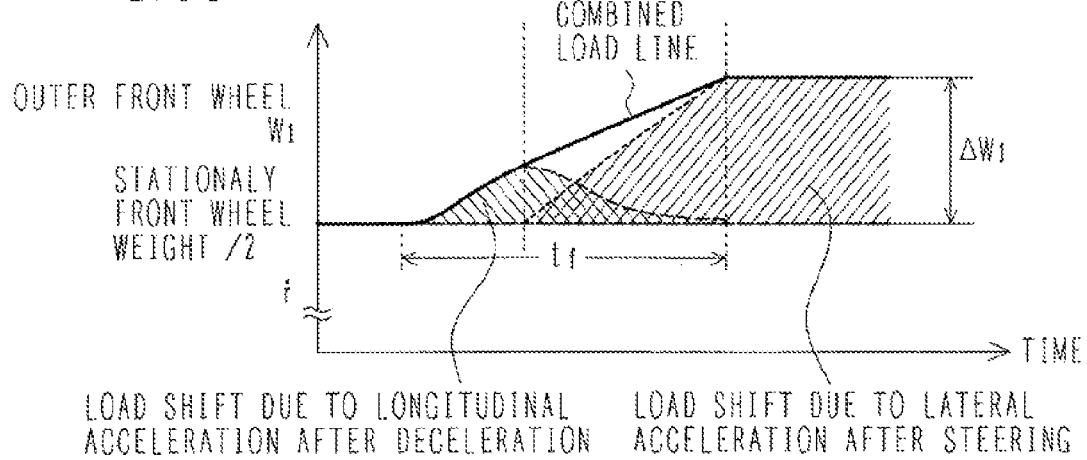
Figure 5D:
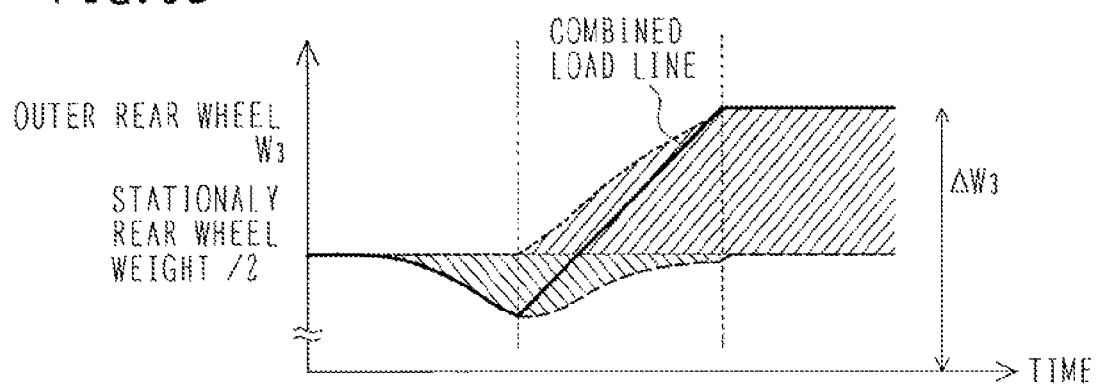
Figure 5E:
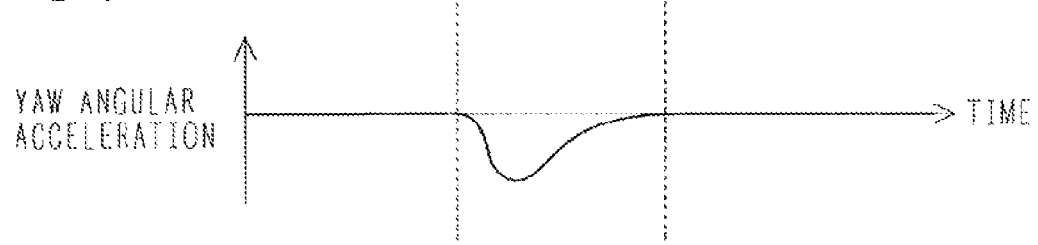

FIG. 5A shows changes in longitudinal and lateral acceleration levels of the vehicle during a change from deceleration to a turn, and FIG. 5B shows changes in longitudinal and lateral jerk data. FIG. 5C shows changes in load W1 of the outer front wheel, FIG. 5D shows changes in load W3 of the outer rear wheel, and FIG. 5E shows changes in yaw rate differential value (yaw angular acceleration). A horizontal axis denotes time. Steering is started in timing of time (t1), and brake release is completed in timing of (t2). After the time (t2), the vehicle starts the steady circular turn at constant lateral acceleration, described above as operation (5).

As described above, steering is started in the timing of the maximum longitudinal acceleration, that is, when the jerk becomes zero. As shown in FIG. 5A, the longitudinal acceleration subsequently decreases with an increase in lateral acceleration. To use the tire force more effectively, it is necessary to increase the tread load and reduce a change rate thereof, so eventually, it becomes optimal to control the acceleration levels in each direction so that as shown in FIG. 5C, the load of the outer front wheel monotonously increases. Such control is due to the reasons below. That is to say, a load shift (convergence value) during the steady circular turn is determined by the lateral acceleration, and ΔW1 is predetermined. The change rate of the tread load can be minimized within a limited time by connecting the curves that denote these parameters, that is, ignoring all discontinuous sections of the connections results in linear changes.

Under this situation, the time-varying change rate W1 of the outer front-wheel load, shown in expression (11), becomes constant and the relationship shown in expression (17) below holds.

$$-K_{OF}\frac{J_y}{g} - K_H\frac{J_x}{g} = K(const) \quad (17)$$

where KOF and KH are determined by the vehicle weight, dimensions, height of the gravitational center, and other vehicle parameters. Also, the change rate K is determined by ΔW1 and a differential time between (A) and (B). The change rate K also exists when ΔW1 is zero, and at this time, K becomes zero. During this control, it is realistic to determine a traveling route by steering operations and conduct precise adjustments based on brake-pedaling force. There is a need at this time to detect both longitudinal jerk and lateral jerk.

Reconsidering the above-described steering initiation timing while referring to expression (17) allows one to see that to keep K constant from the start of the deceleration, the lateral jerk must be generated in the timing of zero longitudinal jerk before the relationship represented by expression (17) can be maintained. It can be considered, therefore, that the moment a value of Jx becomes zero, steering is initiated to maintain the relationship of expression (17).

Provided that expression (17) is the only constraint condition, the option of keeping K constant by, for example, releasing the brake immediately and increasing the lateral jerk, would be usable as an alternative method. The release of the brake, however, would be continued for a time up to (t2) for the reason shown above as item (iii). The load of the outer rear wheel is described below.

The release of the brake shifts the load to the outer rear wheel, subject to expression (3). Since the lateral jerk of the rear wheel increases with its original load reduced by braking, a sudden loss of a braking component under this state causes an associated change curve to overlap the line of the load shift induced by the lateral jerk, and results in a load shift ΔW3 abruptly occurring. If this actually happens, the lateral tire force of the rear wheel will abruptly increase to bring the yawing motion to a sudden stop in accordance with expression (16). Therefore, the release of the brake will necessarily be smooth, the yaw angular acceleration will be zero, and this state will be continued until the timing (t2) has been reached to make the vehicle enter the steady circular turn. The timing (t2) refers to timing in which the lateral jerk becomes constant, that is, the timing in which the lateral jerk decreases to zero.

As set forth above, to control braking during the turn, the lateral jerk needs to be detected and the brake must be released in the timing when the lateral jerk decreases to zero.

Next, state variables relating to the vehicle existing when it changes from turning state (6) to a linear motion while accelerating are described below using FIGS. 6A to 6E.

FIGS. 6A to 6E are explanatory diagrams of the state variables relating to the vehicle existing when it changes from turning state (6) to a linear motion while accelerating.

FIGS. 6A to 6E show substantially the same as FIGS. 5A to 5E. Acceleration is started in timing of time (t3), and the steering wheel is returned to its zero-steering position in timing of time (t4). A uniformly accelerated motion is started after the time (4).

As evident from expression (1) to (4), under the turning state, the loads of the outer wheels are large and the loads of the inner wheels recover with decreases in the lateral jerk for a return to the linear motion. A further increase in longitudinal acceleration by acceleration increases the vertical tire loads of the rear wheels. Combining these situations allows one to see that the vehicle goes through:

(iv) Increases in the loads of the outer wheels (decreases in the loads of the inner wheels) due to the lateral acceleration,
(v) increases in the loads of the rear wheels (decreases in the loads of the front wheels) due to acceleration, and
(vi) decreases in the loads of the outer wheels (increases in the loads of the inner wheels) due to decreases in the steering angle.

After these events, a uniformly accelerated motion is reached. The ideal motion that brings about "smoother driving" and "more efficient use of the tires" at this time is described below.

To change the vehicle state from the steady circular turn to the linear motion, the lateral forces that the tires have generated to oppose the centrifugal force must be made to disappear, and a clockwise yawing moment that each tire has retained during the steady circular turn must be reduced to end the yawing motion. More specifically, it is necessary to reduce the lateral forces of the four wheels to zero in accordance with expression (16) while well balancing the lateral forces of the front and rear wheels and adjusting the yawing moment of each tire.

In this example, attention is also focused upon the outer tires of the vehicle during a turn. When such rightward turn as shown in FIG. 1 is assumed, the left front wheel shown with the index 1 in FIG. 3 is the outer front wheel of the turning vehicle.

Figure 6D:
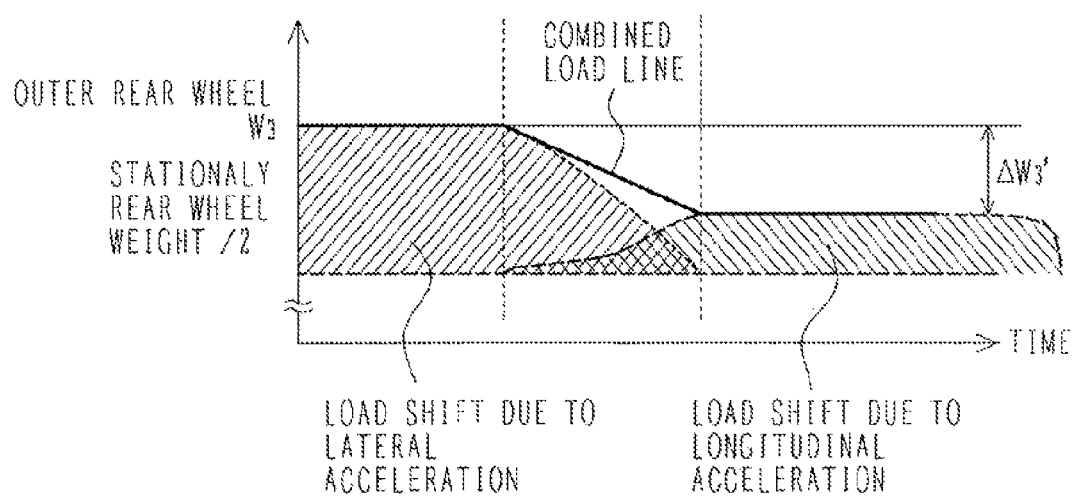
Figure 6E:
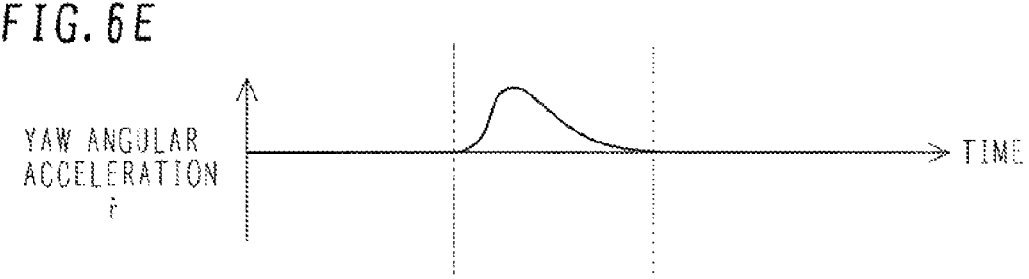

As described above, because of the steady circular turn, acceleration is started in timing (t3) when constant lateral acceleration is maintained, that is, when the lateral jerk decreases to zero, as shown in FIG. 6A. After this, longitudinal acceleration increases and the lateral acceleration decreases. As shown in FIG. 6C, the outer front wheel also increases in ¥W'1 with decreases in load due to decreases in lateral acceleration, and with decreases in load due to acceleration. Thus, the lateral forces of the front wheels are minimized and the clockwise yawing moment is also reduced significantly. Conversely, the outer rear wheel decreases in ¥W'3 as shown in FIG. 6D, since the load of the wheel increases with increases in vehicle speed. Accordingly, decreases in the lateral forces of the rear wheels become small relative to those of the front wheels, thus resulting in reduced decreases in the clockwise yawing moment. This allows the driver to conduct a stable escape from the turn.

Since the lateral force is reduced in this example, the change rate of the tread load must be progressively reduced to use the tire force more effectively. Eventually, it becomes optimal to control the acceleration levels in each direction so that the load of the outer front wheel, shown in FIG. 6D, monotonously decreases. Such control is due to the same reasoning as that of the sequence from deceleration to turning, shown in FIGS. 5A-5E. To implement this control, K<0 in expression (17) must be controlled to a constant value. It is realistic to control K<0 by precisely adjusting the steering angle with the accelerator pedal kept in a constant condition (including a full-throttle state). There is a need at this time to detect both longitudinal jerk and the lateral jerk.

The more specific timing and control technique of the foregoing operations (3), (4), and (6) have so far been described herein. These can be summarized as follows:
(3) Timing in which the driver starts steering during deceleration This is the timing in which the longitudinal jerk becomes zero.
(4) The driver increases the steering angle while loosening the brakes.

There is a need to conduct control for the load of the outer front wheel to monotonously increase. More specifically, the steering angle and the brakes need to be controlled so that a value of expression (11) for a rightward turn or a value of expression (12) for a leftward turn becomes positive and constant. Also, the brakes must be released in the timing when the lateral jerk decreases to zero.
(6) The driver returns the steering angle to its original value while accelerating the vehicle.

Acceleration is started in timing (t3) of zero lateral jerk. There is a need to conduct control for the load of the outer front wheel to monotonously increase. More specifically, the steering angle and accelerator pedaling need to be controlled so that the value of expression (11) for the rightward turn or the value of expression (12) for the leftward turn becomes negative and constant. Also, braking force must be loosened in the timing of zero lateral jerk. The steady circular turning state during operation (5) may therefore be skipped to overlap operations (4) and (6) in terms of timing.

(Extracting a Driving Strategy of the Driver: Experimental Approach)

Next, actual-vehicle verification test results on validity of the foregoing dynamic studies as to accelerator pedaling, steering, and braking operations, are described below using FIGS. 7A and 7B.

Figure 7A:
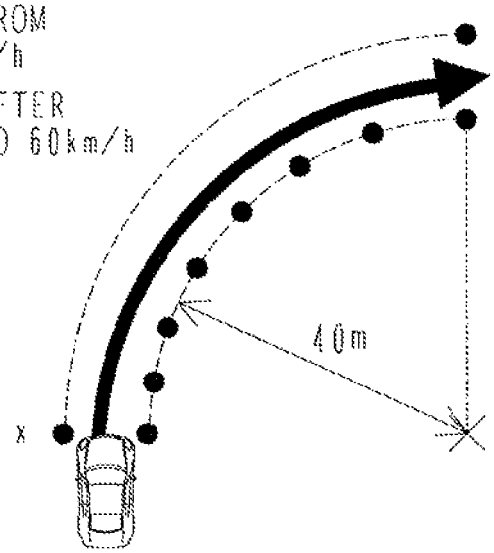
FIGS. 7A and 7B are explanatory diagrams of actual-vehicle tests in the present embodiment.
Figure 7B:
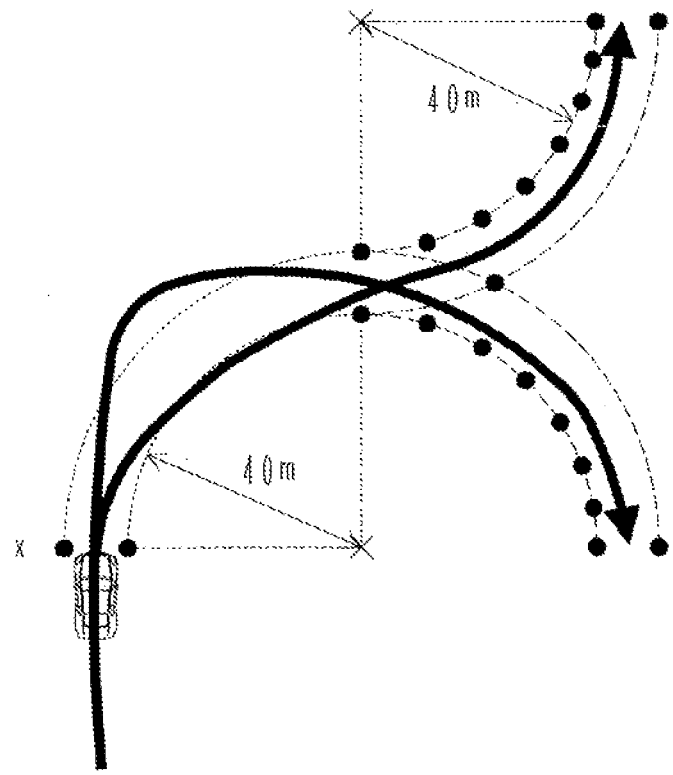

FIGS. 7A and 7B are explanatory diagrams of the actual-vehicle tests.

The tests used a two-wheel-steering vehicle having a front-mounted engine with a displacement of 2,000 cc. Loads of the front wheels are therefore greater than those of the rear wheels.

First, test I shown in FIG. 7A was conducted for two cases. In case (1), a driver slowed down the vehicle from 80 km/h to 60 km/h at a position X, then approached a corner with a radius of 40 m in the driver's desired timing, and maintained the speed. In case (2), the driver accelerated after approaching the corner. During test II shown in FIG. 7B, verifications were conducted to check for changes in the timing of braking, steering, and accelerator pedaling, and in associated operating strategy, due to different routing in turning after braking.

Next, results of the actual-vehicle test I are described below using FIGS. 8A to 8C.

Figure 8A:
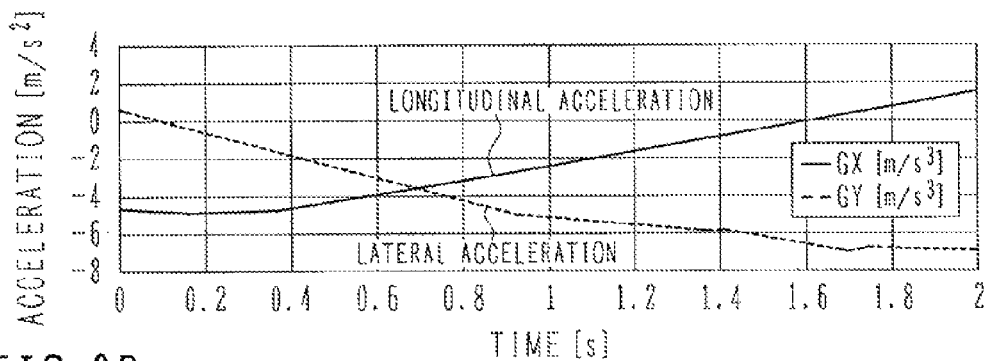
FIGS. 8A to 8C are diagrams that illustrate results of the actual-vehicle test I in the present invention.
Figure 8B:
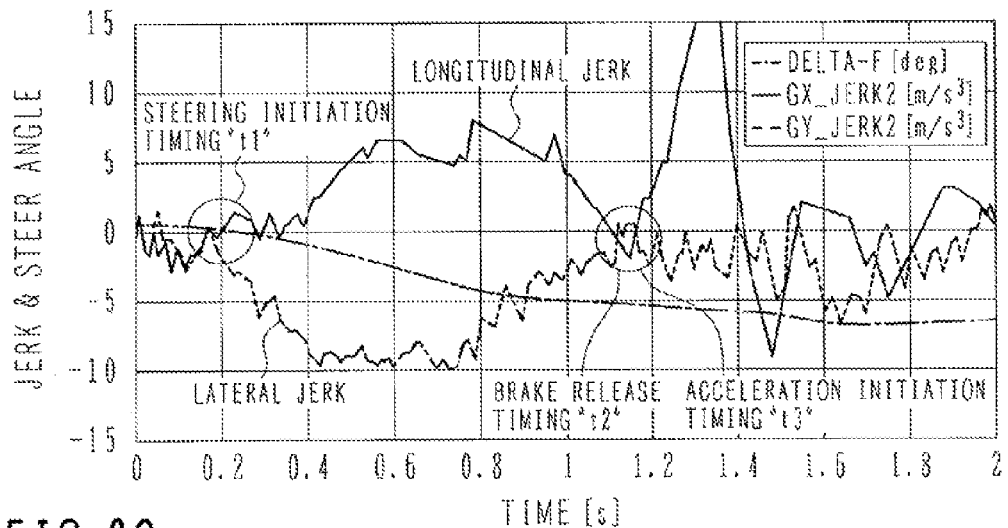
Figure 8C:
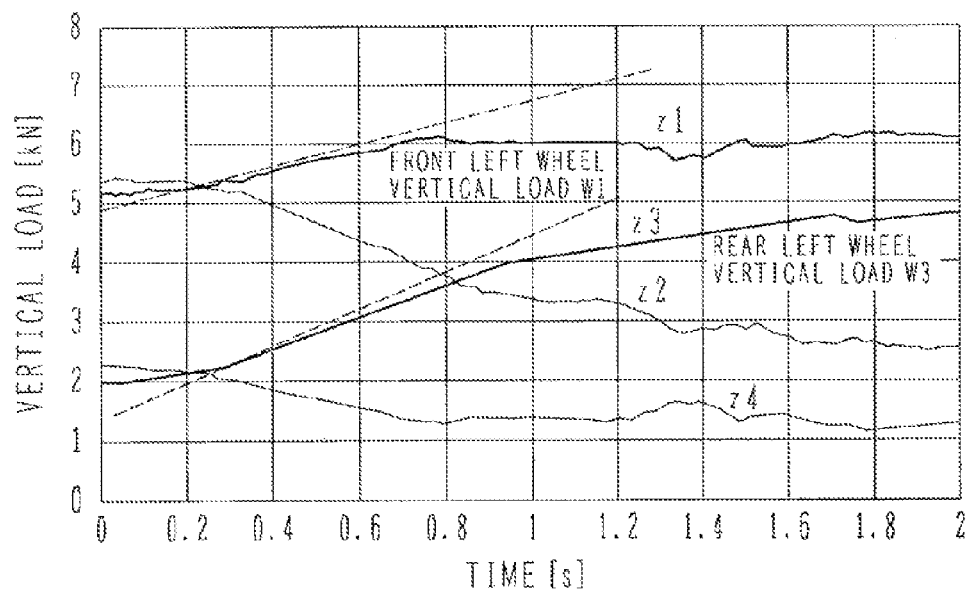
Figure 9B:
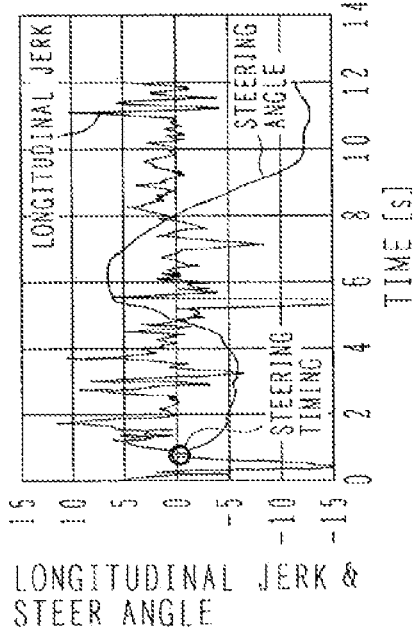
FIGS. 9A to 9H are explanatory diagrams of data extraction results on initiation timing of steering, as results of both tests I and II in the present embodiment.
Figure 9D:
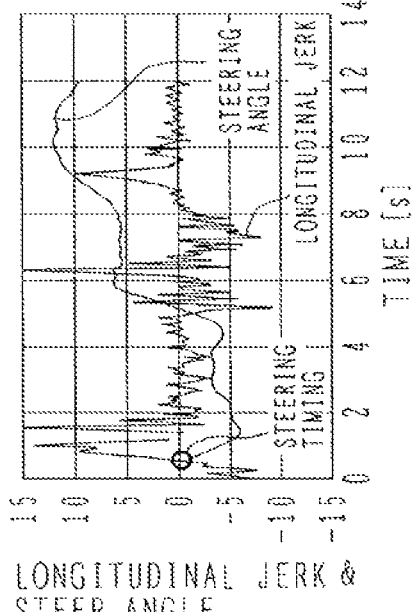
Figure 9A:
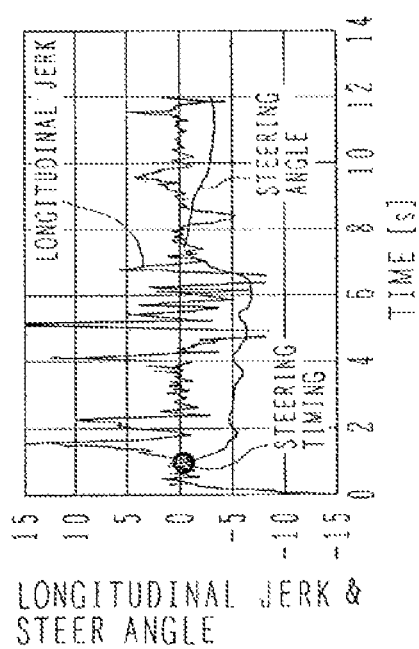
Figure 9C:
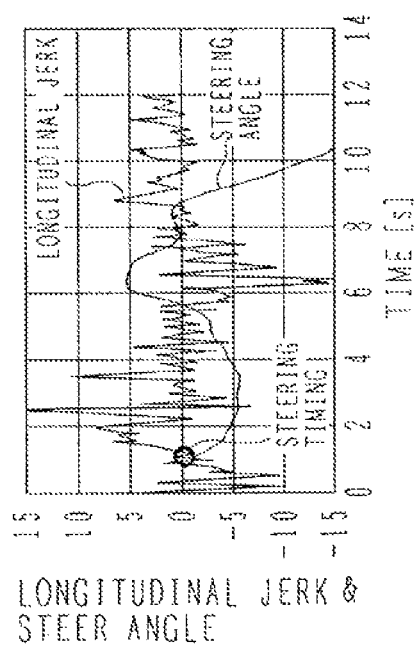
Figure 9E:
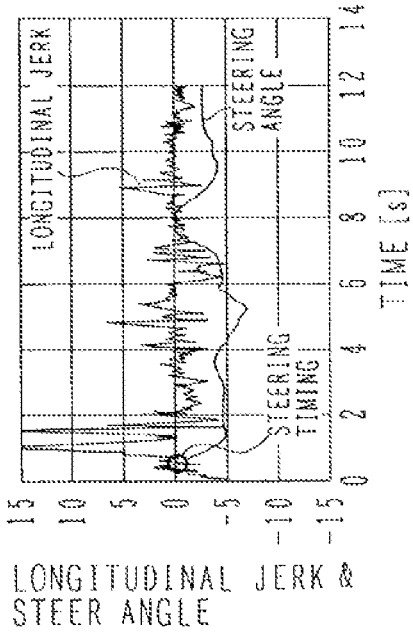
Figure 9F:
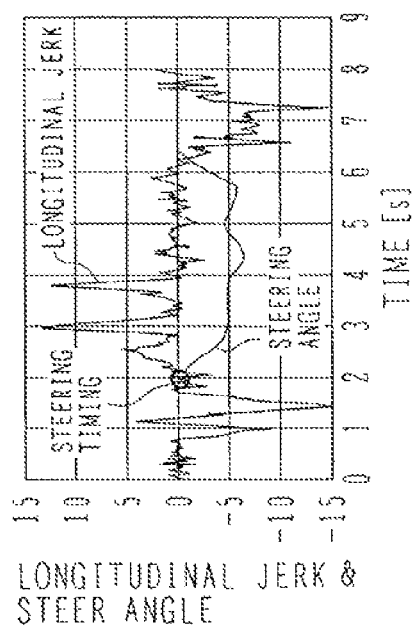
Figure 9G:
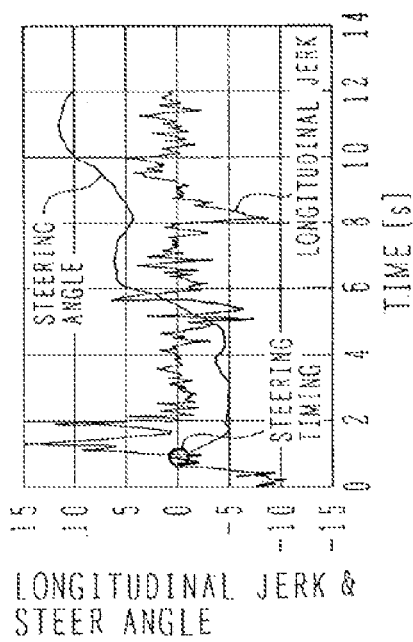
Figure 9H:
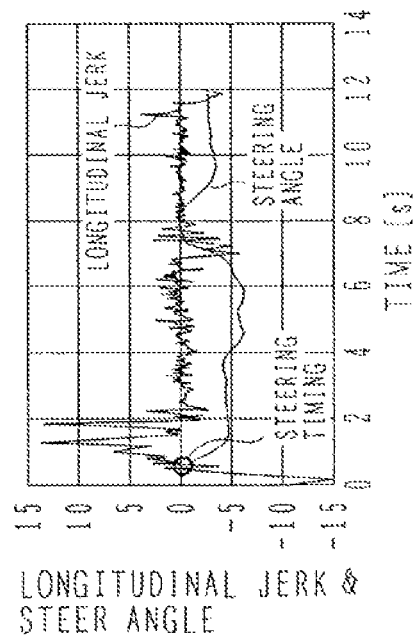
Figure 10B:
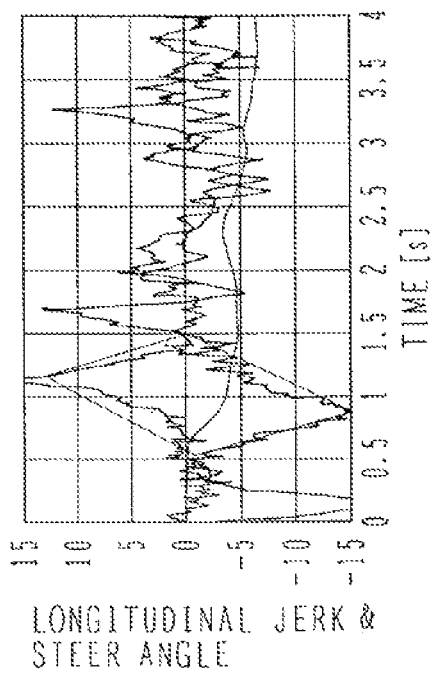
Figure 10D:
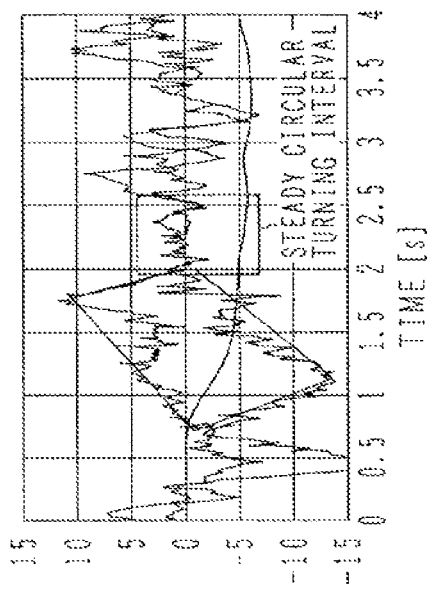
Figure 10A:
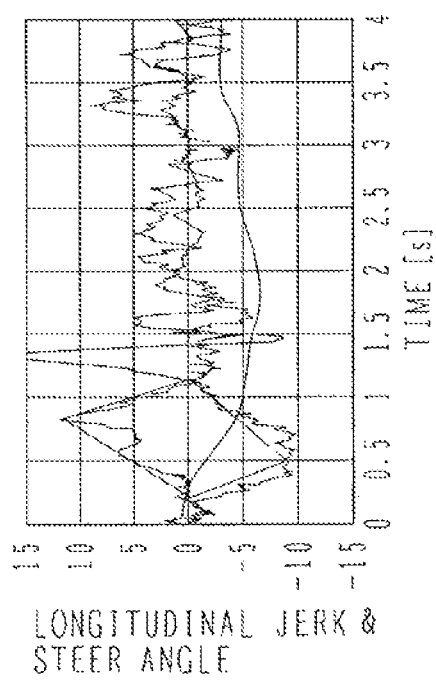
Figure 10C:
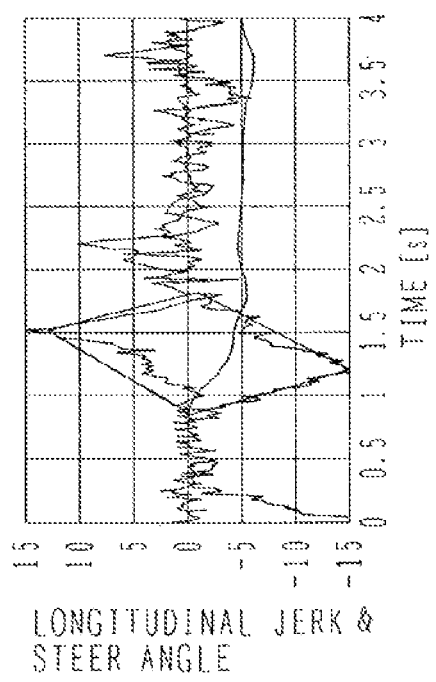
Figure 11A:
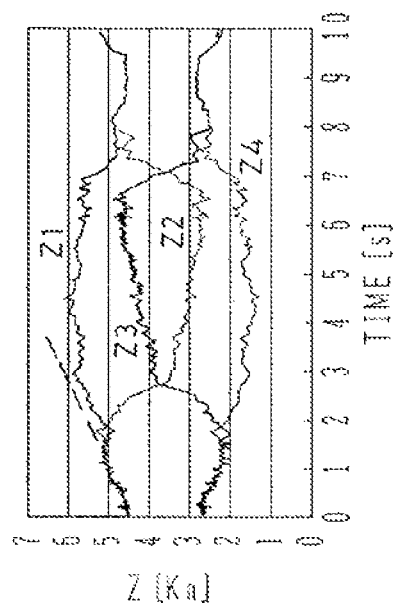
Figure 11B:
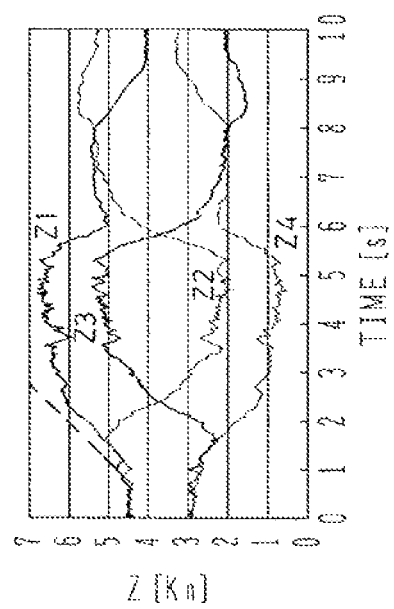
Figure 11C:
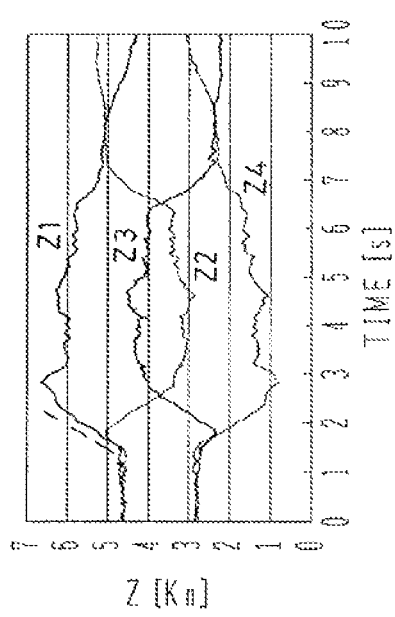
Figure 11D:
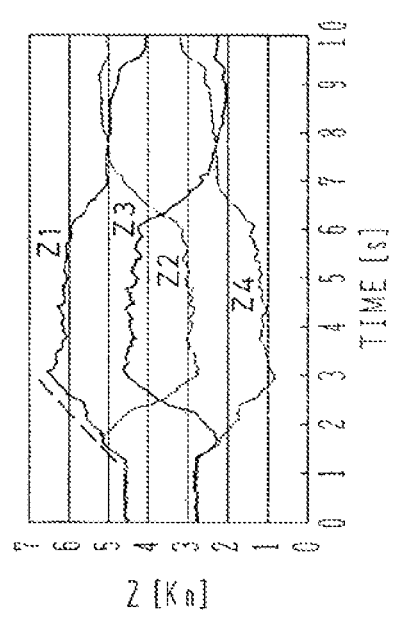

FIGS. 8A to 8C are explanatory diagrams of the results of the actual-vehicle test I.

FIGS. 8A-8C show results of the test sequence (2) consisting of braking, turning, and acceleration, in that order, in test I, and represent these results in a chronological format, as with FIGS. 5A-5E and 6A-6E. FIG. 8A shows changes in longitudinal acceleration and in lateral acceleration. FIG. 8B shows changes in longitudinal acceleration, in lateral acceleration, and in steering angle. FIG. 8C shows changes in vertical loads of each wheel.

It can be seen from FIG. 8B that steering is started in timing of zero longitudinal jerk, that is, after a lapse of 0.2 (s). Also, timing in which brakes are completely loosened (the longitudinal jerk decreases to zero once again) is when the lateral jerk becomes zero, that is, after a lapse of 1.15 (s). In this case, a steady circular turning period is absent, and acceleration is started upon completion of the brake-loosening operation.

It can be seen from FIG. 8C that despite progressive increases in longitudinal acceleration and in lateral acceleration, a load of the front left wheel that is the outer front wheel linearly increases.

Next, results of extracting the initiation timing of steering, as results of both tests I and II, are described below using FIGS. 9A to 9H.

A circle in each of FIGS. 9A to 9H denotes the initiation timing of steering.

Next, results of extracting the completion timing of brake loosening and initiation timing of acceleration, as results of both tests I and II, are described below using FIGS. 10A to 10H.

FIGS. 10A to 10H are explanatory diagrams of the results of extracting the completion timing of brake loosening and initiation timing of acceleration, as results of both tests I and II.

A circle in each of FIGS. 10A to 10H denotes the timing in which the loosening of the brakes is completed, and a triangle denotes the timing in which the vehicle starts accelerating.

Next, analytical results on the vertical loads of each wheel, as results of both tests I and II, are described below using FIGS. 11A to 11H.

FIGS. 11A to 11H are explanatory diagrams of the analyses on the vertical loads of each wheel, as results of both tests I and II.

FIGS. 9A-9H to 11A-11H also show results equivalent to those of FIGS. 8A-8C.

Next, results of vehicle motion simulation tests with a model whose constants were adjusted equivalently to those of the vehicle which was used in the actual-vehicle tests are described below using FIGS. 12A to 12E.

FIGS. 12A to 12E are explanatory diagrams of the vehicle motion simulation test results that were obtained using a model having its constants adjusted equivalently to those of the vehicle tested during the actual-vehicle tests.

Figure 12A:
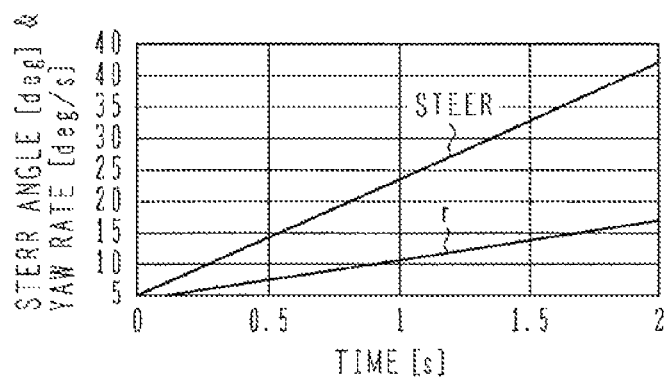
FIGS. 12A to 12E are explanatory diagrams of vehicle motion simulation test results obtained using a model having its constants adjusted equivalently to those of the vehicle tested during the actual-vehicle tests in the present embodiment.
Figure 12B:
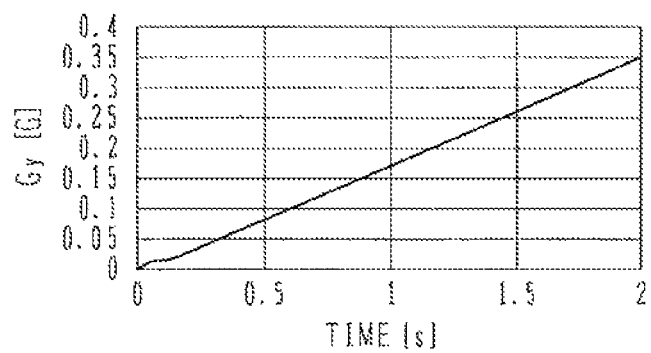
Figure 12C:
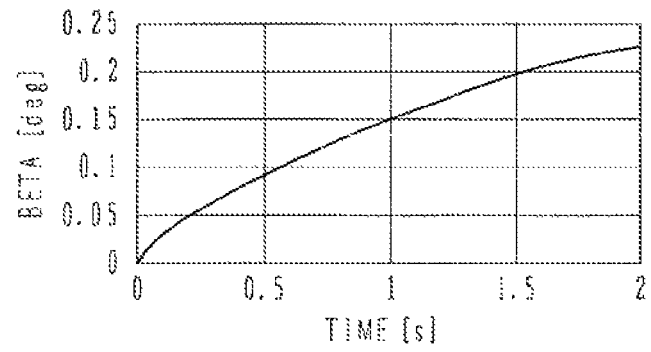
Figure 12D:
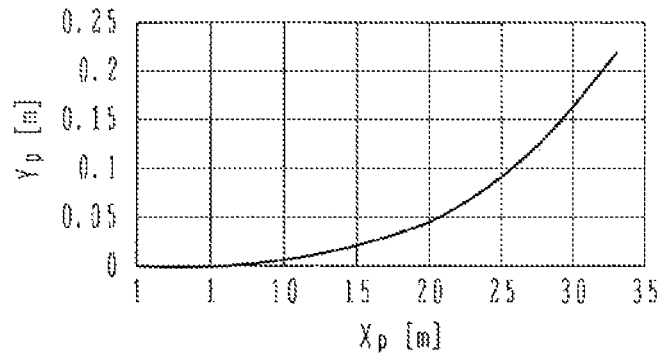

The tests used a model whose constants were adjusted equivalently to those of the vehicle which was used in the actual-vehicle tests, and the model has 10 degrees of freedom (4 for the tires, and 6 for the vehicle body). During the tests, a steering angle was increased in fixed steps of 1.5 deg/s (on an actual-steering basis) at a constant vehicle speed of 60 km/h. Associated steering angle data "steer" is shown in FIG. 12A, lateral acceleration data "Gy" in FIG. 12B, side slipping angle data "Beta" in FIG. 12C, movement path data of the central point of gravity in FIG. 12D, and vertical loads Fz1, Fz2, Fz3, Fz4 of each wheel in FIG. 12E.

The movement path of a vehicle having the above dynamic characteristics is known to exhibit a clothoid curve. The clothoid curve is used as a transition curve to maintain the stability of the vehicle when its movement on an expressway or the like changes from a linear shape to a circular arc shape. In other words, the vehicle behavior that traces the clothoid curve at a constant speed is considered to be stable.

Figure 12E:
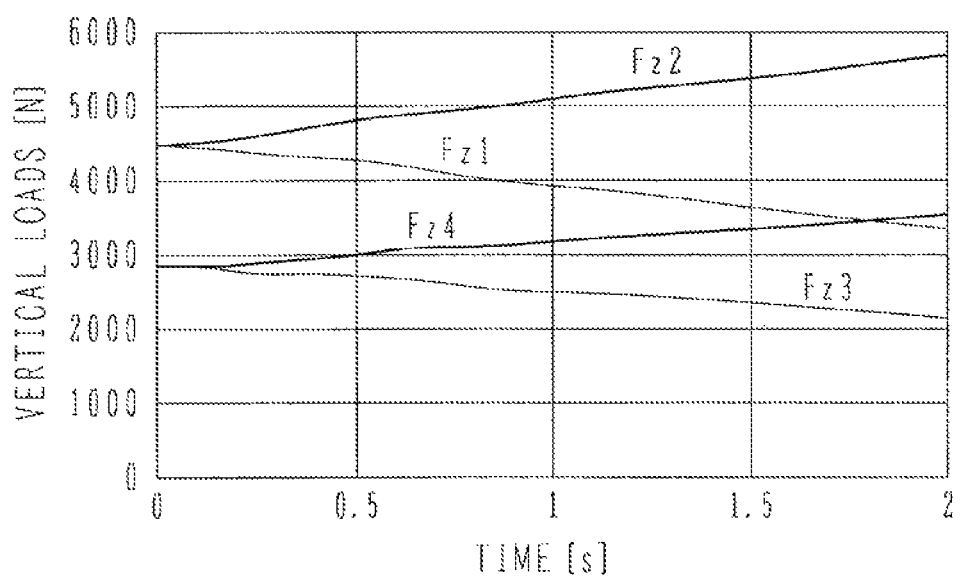

The vertical loads of each wheel, shown in FIG. 12E, are constant in change rate. This indicates matching to the guidelines heretofore disclosed in the present invention about keeping constant the change rates of the wheel loads distributed for a "smoother motion" and "using the tire force more effectively". It can be considered from the above that the guidelines disclosed in the present invention are effective for maintaining transient stability.

After conducting studies for a preferred relationship between the motion of a vehicle and the occurrence of its tire force, the present inventors have derived the above guidelines from the idea of determining the timing of the steering, braking, and accelerating operations, and minimizing the change rates of the vertical loads. Consequently, the inventors have been able to verify, through actual-vehicle tests, the fact that driving by the actual driver is also based on a similar driving strategy. The validity of the dynamic studies has been verifiable from these test results.

As described above, the tires are usually used in the range that a gain increases with respect to load. Under specific motion conditions, however, vertical loads could increase to a range that oversteps a maximum attainable level of the gain. In such a case, although a jerk will occur that acts in a direction reverse to that of the acceleration generated by operations such as steering, accelerating, or braking, the jerk can be controlled by slightly returning the steering wheel, the accelerator pedal, or the brake pedal, after detecting the jerk. This control can use, for example, the control method described in Japanese Patent No. 3733929.

The configuration of a vehicle motion control system will not be considered on the basis of the knowledge that has heretofore been disclosed herein. A driver is considered to operate a steering wheel according to a particular target course and conduct position feedback control for a movement path of the vehicle to match the target course. Automatic driving systems that conduct fully automatic control of braking and steering are currently realized as lane-keeping systems for driving on expressways and the like. In the future, systems for avoiding collisions automatically if the vehicle in front comes to an abrupt stop will also be proposed.

These systems receive information from outside and use this information to control positions.

A concept of the vehicle motion control system according to the present invention is described below using FIG. 13.

Figure 13:
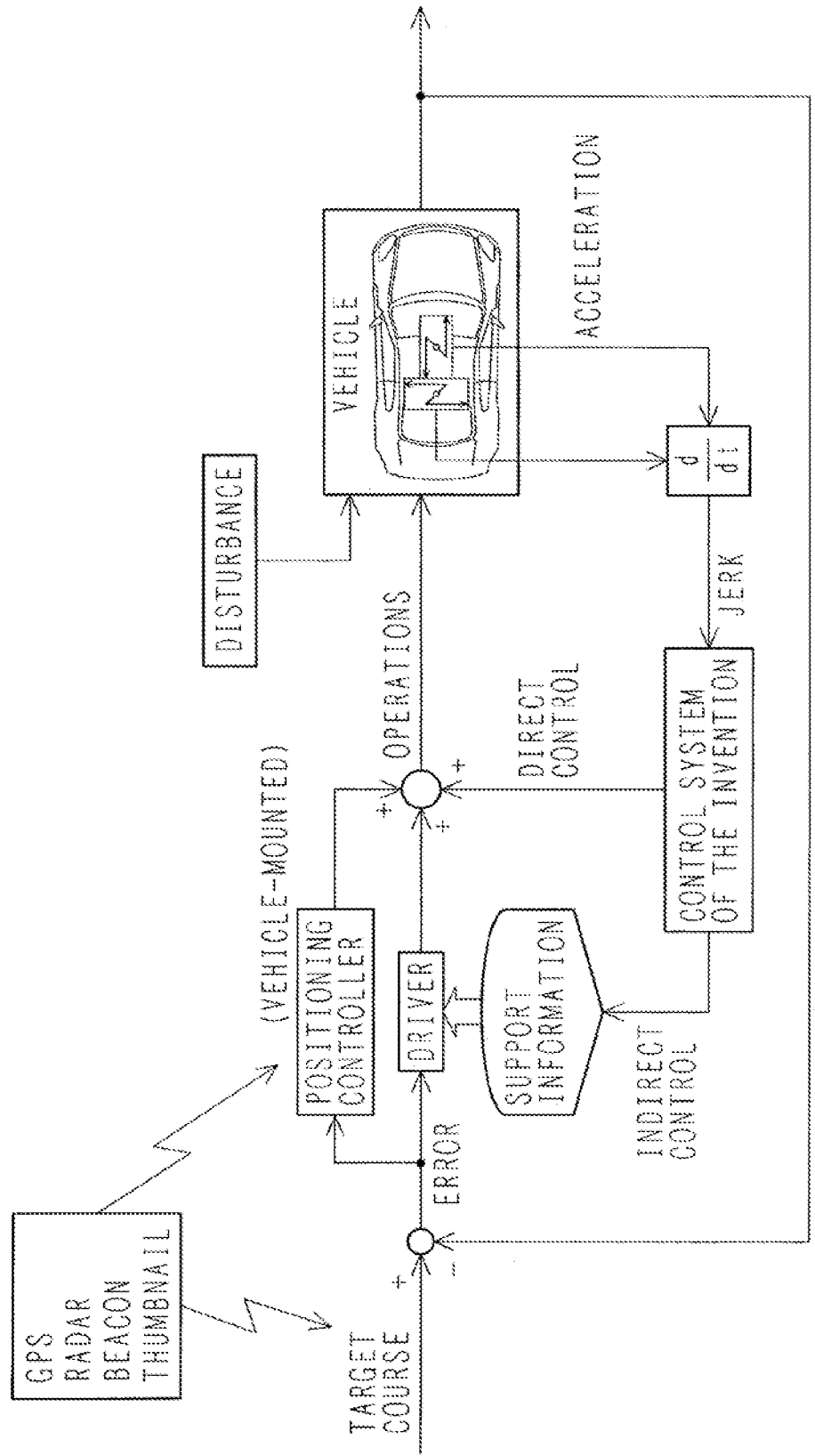
FIG. 13 is a conceptual explanatory diagram of a vehicle motion control system according to an embodiment of the present invention.

FIG. 13 is a conceptual explanatory diagram of the vehicle motion control system according to the present invention.

The control system according to the present invention is constructed to enter an internal minor loop of a closed positioning loop created by the driver or by the controller of a lane-keeping system or the like, and assign, in addition to the driver's or controller's steering, braking, and accelerating commands for positioning, commands for implementing the "smoother motion" and "more effective use of the tire force" heretofore described as an ideal motion. In this construction, the control system according to the present invention operates in such a range that avoids divergence of the closed positioning loop system.

More specifically, in addition to fully automatic control of braking and steering, two modes of control would be usable. One is "direct control" in which the driver undertakes part of the operations required and the control system conducts necessary compensations by utilizing advantages of a "by-wire". The other is "indirect control" that presents support information to the driver and assists the driver in the driving operations. When the driver in the closed loop is regarded as a controller, use of "information" makes it possible to improve control performance and hence, performance of the entire system.

The configuration and operations of a vehicle motion control system according to an embodiment of the present invention is described below using FIGS. 14 to 19A-19C.

Figure 14:
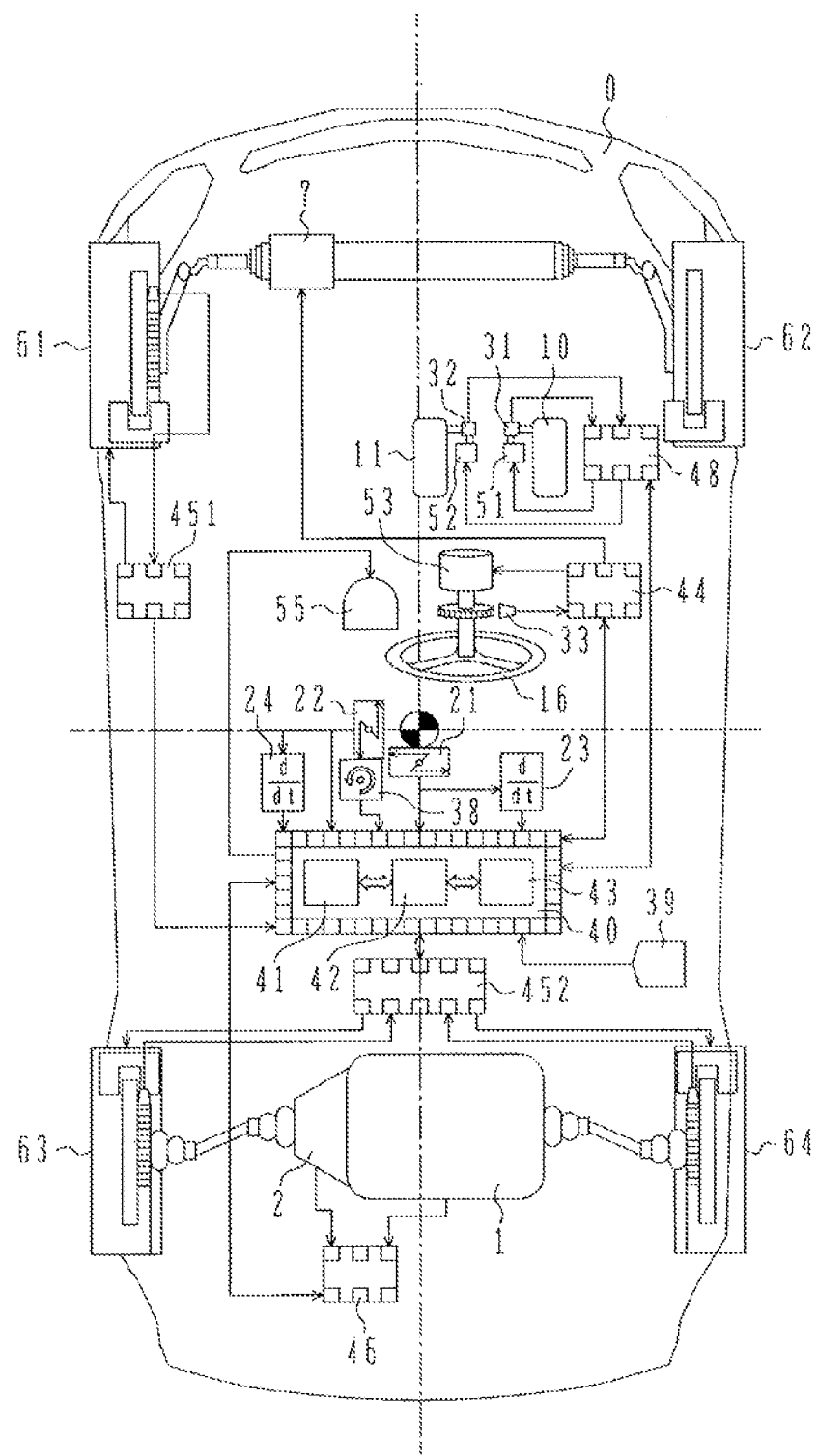
FIG. 14 is a block diagram showing a system configuration of a vehicle system applying the vehicle motion control system according to the present embodiment.

First, the configuration of a vehicle system applying the vehicle motion control system according to the present embodiment is described using FIG. 14.

FIG. 14 is a block diagram showing the system configuration of the vehicle system applying the vehicle motion control system according to the present embodiment.

Vehicle 0 is a rear-engine rear-drive vehicle (RR vehicle) with an engine 1 mounted at rear to drive a front left wheel 63 and a front right wheel 64. Alternatively, the driving scheme may be front-engine rear-drive (FR) or front-engine front-drive (FF). The vehicle 0 is of a so-called "by-wire system" configuration, in which no mechanical coupling exists between a steering wheel, accelerator pedal, and brake pedal operated by a driver, and a steering mechanism, an accelerator mechanism, and a decelerator mechanism.

A front left wheel 61, a front right wheel 62, a rear left wheel 63, and a rear right wheel 64 each have a brake rotor, a wheel speed detection rotor, and a wheel speed pickup disposed in the vehicle, and these constituent elements allow wheel speeds of each wheel to be detected.

The amount of accelerator pedal 10 stepped on by the driver is detected by an accelerator pedal position sensor 31 and then arithmetically processed by a central controller 40 via a pedal controller 48. A power train controller 46 controls a throttle, fuel injector, and other constituent elements (not shown) of the engine 1 according to the detected amount of stepping on the accelerator pedal 10. Also, an output from the engine 1 is transmitted to the rear left wheel 63 and the rear right wheel 64 via a transmission 2 electronically controlled by the power train controller 46. In addition, the accelerator pedal 10 has an accelerator reaction motor 51 connected thereto. Based on an arithmetic command from the central controller 40, reaction control is conducted by the pedal controller 48.

The vehicle 0 has a front-wheel steering system, which is of a steer-by-wire structure without mechanical coupling between the driver's steering angle and orientation of tires. The steering system includes power steering 7 internally having a steering angle sensor (not shown). The steering system also includes a steering wheel 16, a driver's steering angle sensor 33, and a steering controller 44. An operating amount of steering wheel 16 by the driver is detected by the driver's steering angle sensor 33 and then arithmetically processed by the central controller 40 via the steering controller 44. The steering controller 44 controls the power steering 7 according to the amount of manipulation of the steering wheel 16. Also, the steering wheel 16 has a steering reaction motor 53 connected thereto. Based on an arithmetic command from the central controller 40, reaction control is conducted by the steering controller 44.

The amount of brake pedal 11 stepped on by the driver is detected by a brake pedal position sensor 32 and then arithmetically processed by the central controller 40 via the pedal controller 48.

The front left wheel 61, the front right wheel 62, the rear left wheel 63, and the rear right wheel 64 each have a brake rotor. Calipers are mounted in the vehicle body to decelerate the wheels by sandwiching each brake rotor between pads (not shown). The calipers are of a hydraulic type or an electric machine type having an electric machine motor for each caliper. The calipers are basically controlled by brake controllers 451 (for the front wheels) and 452 (for the rear wheels), subject to arithmetic commands from the central controller 40. The above-mentioned wheel speeds of each wheel are sent as input signals to the brake controllers 451, 452, by which a vehicle velocity V of the vehicle is then calculated. These signals are monitored as shared information by the central controller 40 at all times. Also, the brake pedal 11 has a brake reaction motor 52 connected thereto, and based on an arithmetic command from the central controller 40, reaction control is conducted by the pedal controller 48.

Next, motion sensors in the present embodiment are described below. As shown in FIG. 14, a lateral acceleration sensor 21 and a longitudinal acceleration sensor 22 are arranged around a central point of gravity of the vehicle. Also, differentiation circuits 23, 24 are mounted to differentiate outputs of the acceleration sensors 21, 22 and obtain jerk information. In FIG. 14, these differentiation circuits in the present embodiment are shown near the sensors 21, 22 in order to make presence of the differentiation circuits clear. As a matter of fact, however, acceleration signals may be input directly to the central controller 40 and then undergo various arithmetic processing before the outputs are differentiated.

In addition, the vehicle 0 has a human-vehicle interface (HVI) 55 for transferring assist information that an ideal motion control unit 42 transmits to the driver, and the assist information is used for "indirect control."

The vehicle 0 has a "driver mode" and an "automatic driving mode". In the "driver mode", the vehicle moves primarily in accordance with inputs from the driver. Detailed description of the "automatic driving mode" is omitted. The central controller 40 is constructed so that an automatic driving control unit 41, a driver's driving control unit 43, and the ideal motion control unit 42 in the present embodiment can exchange signals with one another. In the "automatic driving mode", the automatic driving control unit 41 is active and conducts control so that a position of own vehicle matches a position on a desired route. The control is based on an absolute position signal from a global positioning system (GPS), a radar ranging signal, various information from a beacon, a position signal from a thumbnail, and other signals acquired by external sensors 39, and on signals sent from a raw rate sensor 38, wheel speed sensors, or acceleration sensors mounted in or on the vehicle. The ideal motion control unit 42 intercommunicates with the automatic driving control unit 41 and the driver's driving control unit 43, and in addition to positioning control based on inputs from the automatic driving control unit 41 or the driver, conducts either "direct" control or "indirect control" which involves the driver intervention.

Next, a relationship between control input and output signals in the vehicle motion control system according to the present embodiment is described below using FIG. 15.

Figure 15:
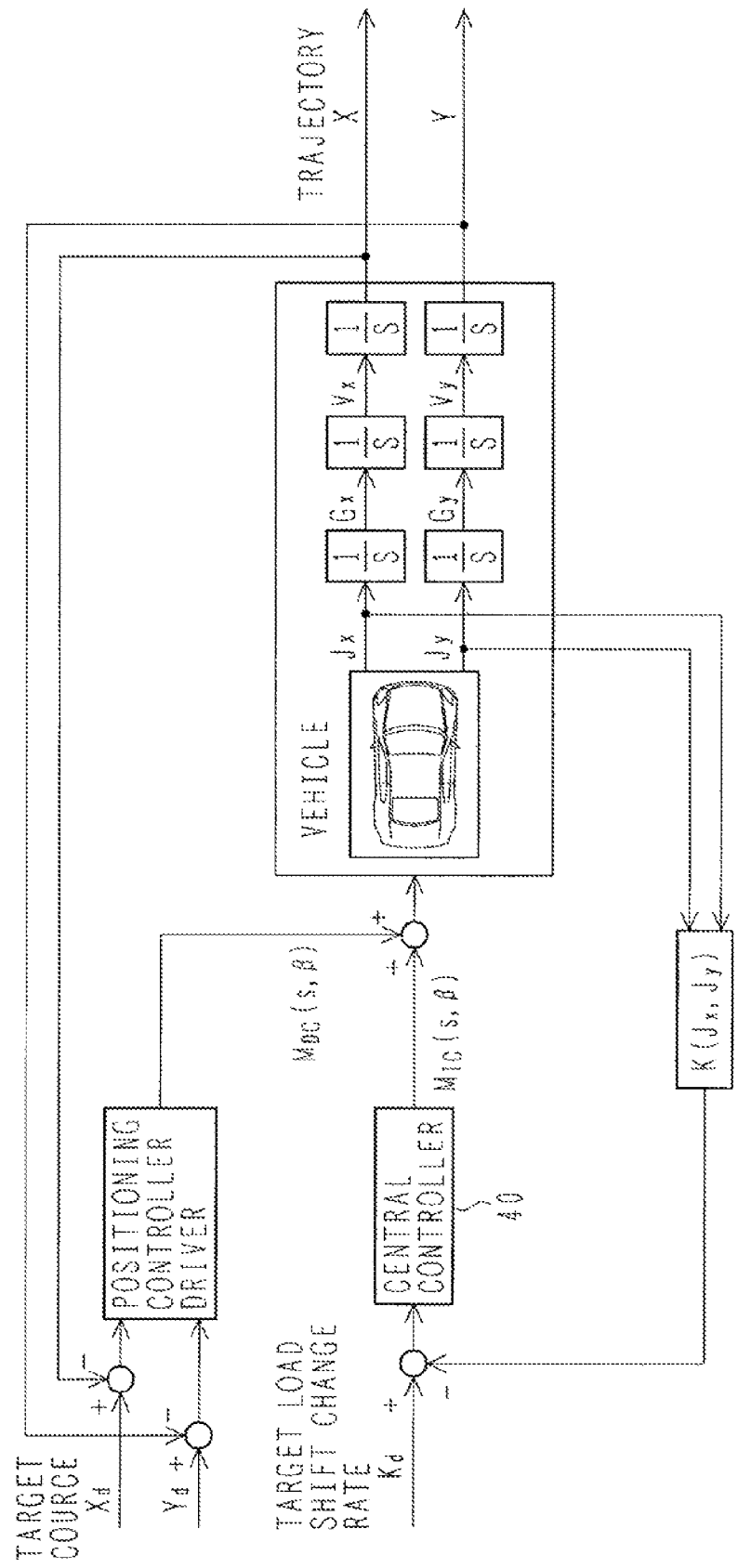
FIG. 15 is a system block diagram showing a relationship between control input and output signals in the vehicle motion control system according to the present embodiment.

FIG. 15 is a system block diagram showing the relationship between the control input and output signals in the vehicle motion control system according to the present embodiment.

Conventional motion control systems have conducted the control that follows the side slipping angles and yaw rates obtained by entering desired course data, vehicle speed data, driver's steering angle data, or the like into a motion prescriptive model.

In the present embodiment, however, a section that makes the vertical load change rate K of the tires, representable by expression (17), follow a target load shift change rate Kd, is added to the above control employed in the conventional motion control systems, and the ideal motion control unit 44 undertakes the added control. Of all the above follow-up items, only target course follow-up is shown in FIG. 15, and yaw rate data is omitted from an integral description of motions.

The automatic driving control unit 41 and the driver's driving control unit 43 conduct an MDC (s, β) process to adjust a tire slipping rate "s" and side slipping angle β for each wheel of the vehicle 0 according to a particular deviation from the target course, detected positions of the brake pedal and the accelerator pedal, and a detected steering angle of the steering wheel. The ideal motion control unit 44 conducts a correction process MIC (s, β) during "direct control". During "indirect control", support information is determined from the above process results and presented to the driver.

This control function is not continuously performed; it is primarily performed, only during turns or when such disturbance as shown in FIG. 13 causes load changes.

In the present embodiment, initiation timing of the control and termination timing thereof are set as follows on the basis of the foregoing concept of motion control:

Initiation timing: When braking or acceleration is started (longitudinal jerk occurs)

Termination timing: When the vehicle conducts a steady turn or linearly moves (lateral jerk becomes zero)

The control system is therefore constructed to determine the initiation timing and termination timing of the control automatically by detecting each jerk component and comparing the detected components with arbitrarily predetermined data.

Next, a method of setting the target load shift change rate Kd is described below. A method of acquiring Kd depends on whether the "automatic driving mode" or the "driver mode" is selected. The following describes details of the control in each mode:

1) Automatic Driving Mode

First, the control that the vehicle motion control system according to the present embodiment conducts in the automatic driving mode is described using FIGS. 16A to 16E.

FIGS. 16A to 16E are explanatory diagrams of the control that the vehicle motion control system according to the present embodiment conducts in the automatic driving mode.

In the automatic driving mode, basic positioning control and vehicle attitude control relating to the yawing angle and other factors of the vehicle are accomplished by the automatic driving control unit 41. A current velocity (Vo) of the vehicle can be measured using the wheel speed, GPS information, or other information. Also, a distance Xo to the corner, a radius R of the corner, and a preset vehicle velocity $V_R$ in the corner are known from topographic information obtained from various sensors and a map. With these pieces of information alone, however, guidelines on "integrated control", that is, on when and how the automatic driving control unit 41 is to control braking and steering operations, are unknown. FIG. 16B shows the acceleration occurring at this time, FIG. 16C shows the vehicle speed, FIG. 16D shows a position of the vehicle on the target course, and FIG. 16E shows a load W1 of the outer front wheel. For simplification of the description here, it is assumed that the method of controlling such tire slipping rate "s" and side slipping angle β of each wheel that provide a constant jerk during braking and steering is known, and the longitudinal jerk and lateral jerk of the vehicle are controlled to be constant during a required period of time.

Figure 16A:
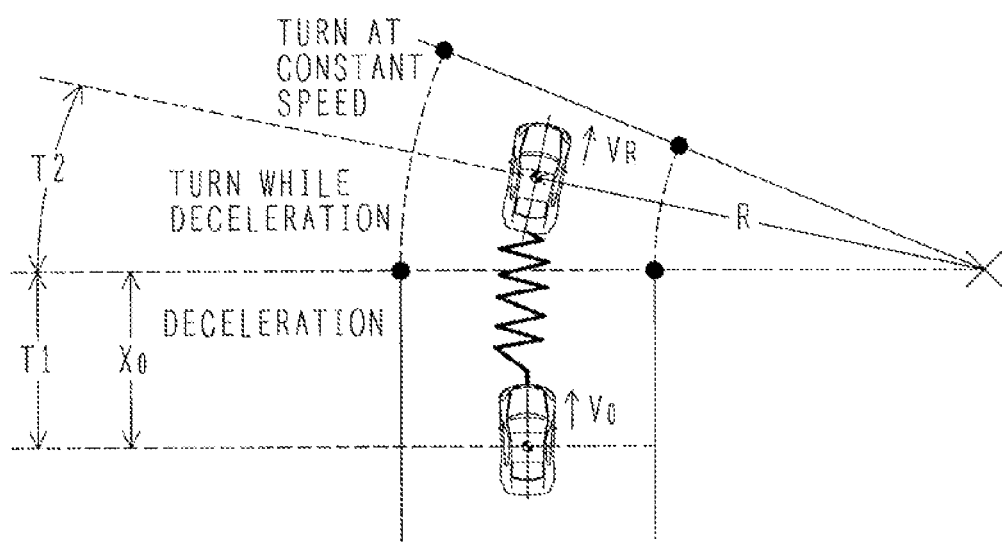
FIGS. 16A to 16E are explanatory diagrams of control in automatic driving mode by the vehicle motion control system according to the present embodiment.
Figure 16B:
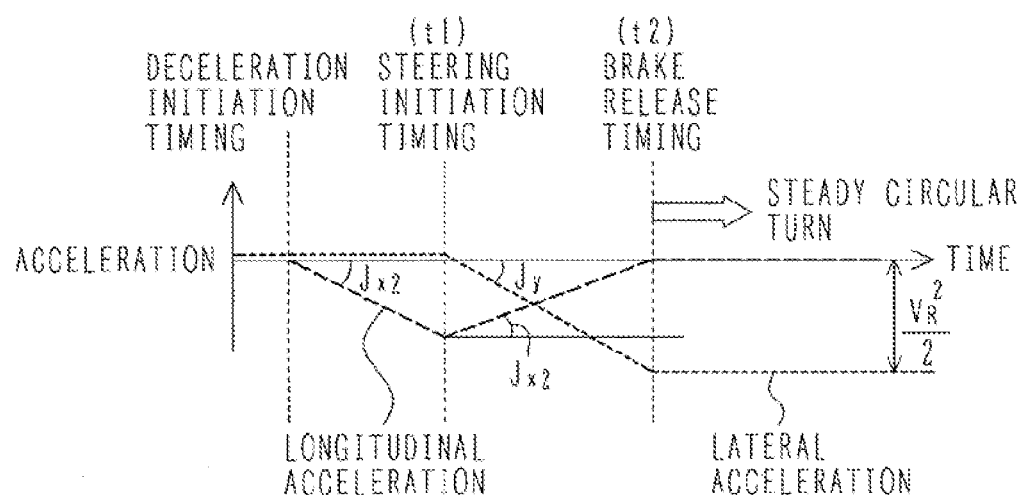
Figure 16C:
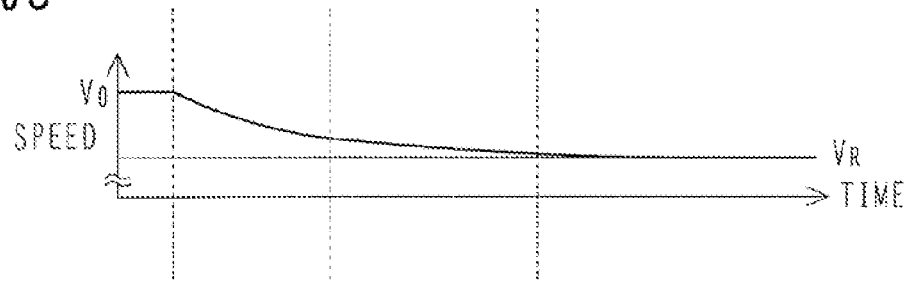
Figure 16D:
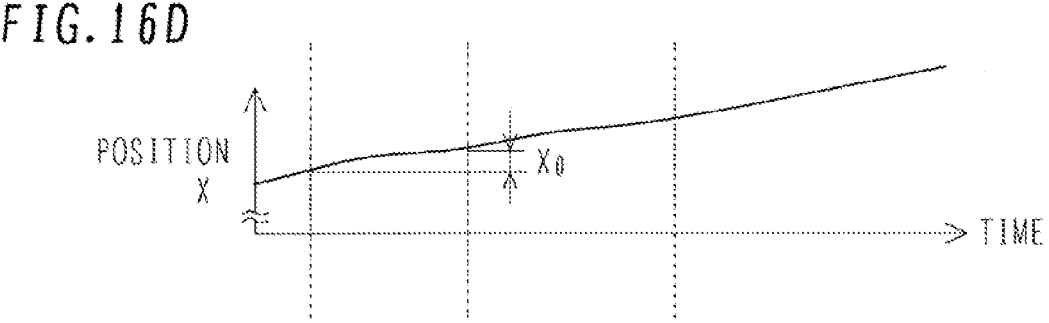
Figure 16E:
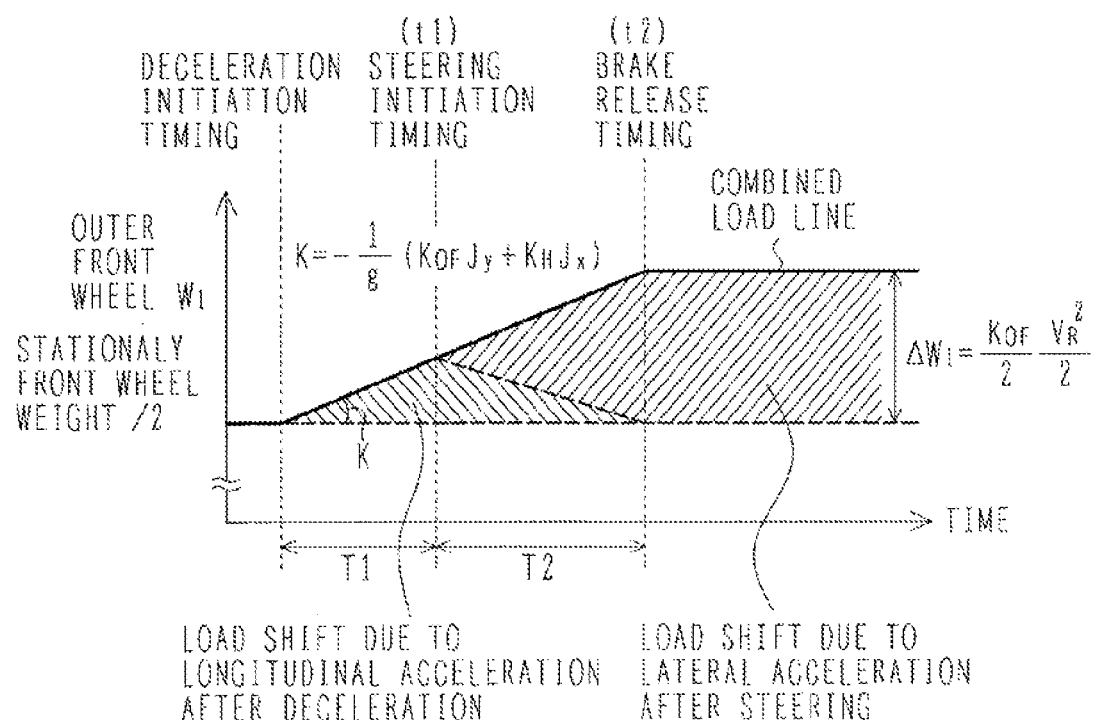

As shown in FIGS. 16A, 16B, before the vehicle approaches the corner, braking is first started at a jerk of $J_{x1}$ and at a distance of X0 from a proximal edge of the corner. Next after a time of T1 has elapsed, the brakes are loosened (longitudinal jerk decreases to zero), and at the same time, steering is started. After this, lateral acceleration decreases at a jerk of $J_y$ and longitudinal acceleration increases at a jerk of $J_{x2}$. After a time of T2 has elapsed from this, the vehicle enters a steady circular turn with the radius R and at the velocity VR. At this point of time, the lateral jerk decreases to zero, the brake-loosening operation is completed, and the longitudinal jerk also decreases to zero. Variables that the present inventors are intend to substantiate in this case are the jerk $J_{x1}$, the jerk $J_{x2}$, the time T1, and the time T2. In connection with this, $J_y$ is calculated using $(J_{x1}-J_{x2})$. At this time, the following four relational expressions, that is, (18), (19), (20), (21), hold:

$$J_{x1} \cdot t_1 + J_{x2} \cdot t_2 = 0 \tag{18}$$

$$J_y \cdot t_2 = \frac{K_H}{K_{OF}}(J_{x1} - J_{x2}) \cdot t_2 = V_R^2 \tag{19}$$

$$V_R - V_0 = \frac{1}{2}(J_{x1} \cdot t_1^2 + 2J_{x1} \cdot t_1 \cdot t_2 + J_{x2} \cdot t_2^2) \tag{20}$$

$$X_0 = \frac{1}{6}J_{x1} \cdot t_1^3 + V_0 \cdot t_1 \tag{21}$$

Since the number of unknowns and relational expressions is four, Jx1, Jx2, T1, and T2 are substantiated. Also, the target Kd value to be acquired at this time can be determined as follows using expression (22) below.

$$K_d = -K_{OF}\frac{J_{x1}}{g} = -K_{OF}\frac{J_{x2}}{g} - K_H\frac{J_y}{g} \tag{22}$$

As can be seen from the above, in the automatic driving mode, the target Kd can be calculated from a desired starting position of braking. In addition, if a starting vehicle velocity (Vo) of cornering is equal to the preset vehicle velocity ($V_R$) in the corner, the longitudinal jerk will decrease to zero and the vehicle will start to turn with a constant jerk $J_y$ from the position X0 and enter a steady circular turn after this. A movement path of the vehicle up to the start of the steady circular turn will take the shape of the clothoid curve as described in FIG. 12D.

2) Driver Mode

Figure 17B:
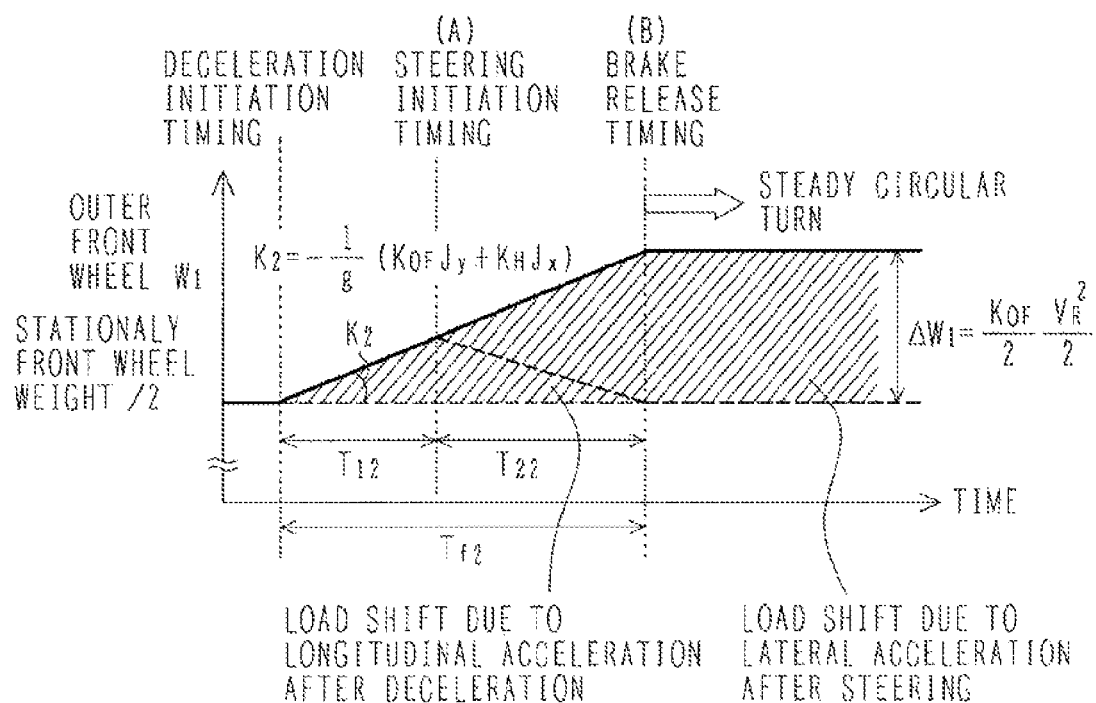
Figure 17C:
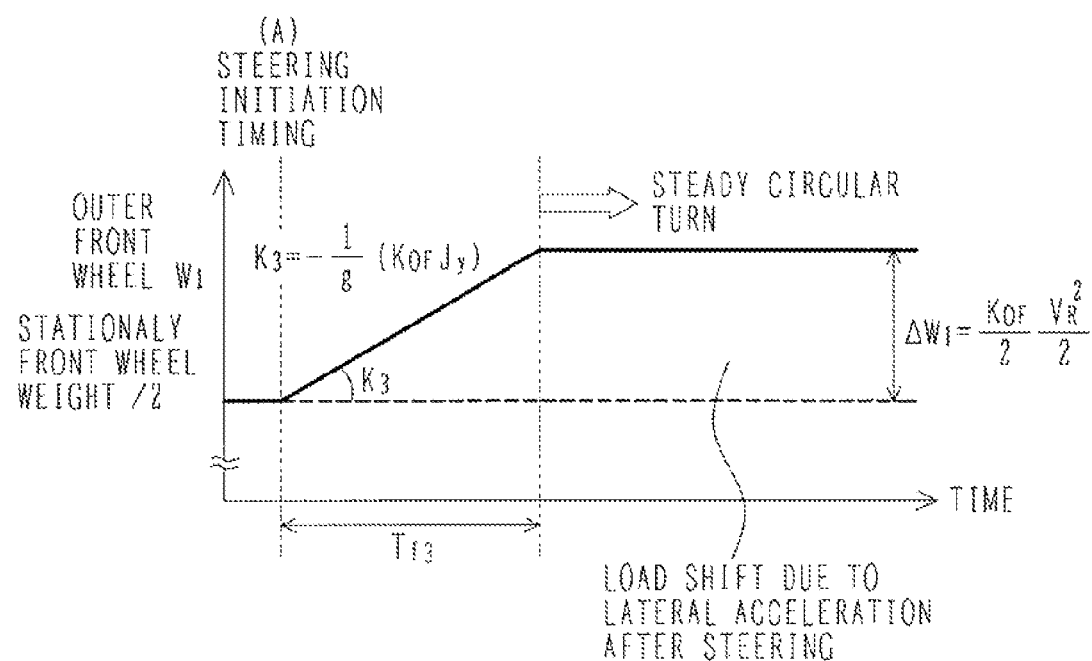

Next, the control that the vehicle motion control system according to the present embodiment conducts in the driver mode is described using FIGS. 17A to 17C. FIGS. 17A to 17C are explanatory diagrams of the control that the vehicle motion control system according to the present embodiment conducts in the driver mode.

A method of acquiring the target Kd in the driver mode is described below. Expression (22) studied in the above statement indicates the following.

The target Kd is predetermined by $J_{x1}$ (initial braking longitudinal jerk).

If braking is unnecessary, Kd is determined by $J_y$ (initial steering lateral jerk).

Additionally, FIGS. 11E and 11F that show the test results described previously in this Specification indicate the following events.

If the braking period of time is extended to a certain degree, the braking operation will be considered separately from linear braking, the non-linear braking section will be recognized as an offset of a DC component, and Kd will be newly determined by the $J_y$ resulting from steering.

In this perspective, in the driver mode, Kd is eventually considered to be predetermined by Jx (initial braking longitudinal jerk), as shown in FIGS. 17A and 17B, or predetermined by $J_y$ (initial steering lateral jerk), as shown in FIG. 17C.

In all of these cases, therefore, the following expression (23) can be used to acquire the target Kd by measuring the first jerk values Jx_start and Jy_start obtained during the start of operation.

$$K_d = -K_{OF}\frac{J_{x\_start}}{g} - K_H\frac{J_{y\_start}}{g} \tag{23}$$

In this way, the target load shift change rate Kd can be acquired in either the "automatic driving mode" or the "driver mode". Particularly in the "automatic driving mode", since there are no inputs from the driver, the control system alone can freely adjust the tire slipping rate "s" and side slipping angle β of each wheel according to the particular brake pedal position, accelerator pedal position, and steering angle. The control system according to the present invention can also be constructed so as to detect the longitudinal jerk and lateral jerk of the vehicle, start steering at the same time the longitudinal jerk becomes zero, and terminate the loosening operation of the brakes when the lateral jerk becomes zero.

In addition, as is evident from the relationships shown in FIGS. 5A-5E and 6A-6E concerning the timing changes from deceleration to turning and from turning to linear acceleration, using a method equivalent to that described above makes it possible to construct the control system so that it detects the longitudinal jerk and lateral jerk of the vehicle, starts accelerating at the same time the lateral jerk becomes zero, and terminates the returning operation of the steering wheel when the longitudinal jerk becomes zero. Description of this construction is omitted herein.

Figure 18:
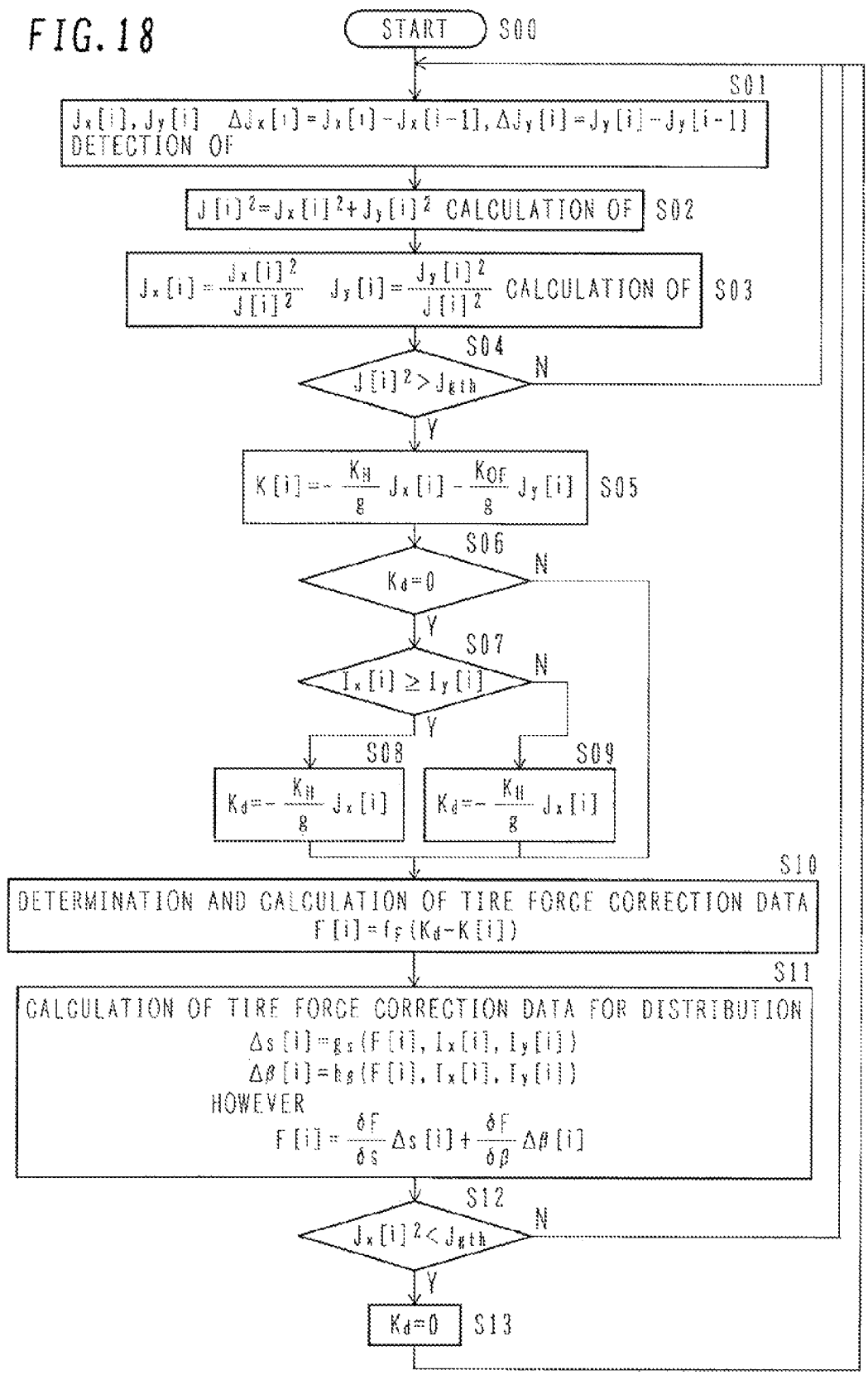
FIG. 18 is a flow chart showing an execution sequence of the control in driver mode by the vehicle motion control system according to the present embodiment.

Next, the control that the vehicle motion control system according to the present embodiment conducts in the driver mode is described using FIG. 18.

FIG. 18 is a flow chart showing an execution sequence of the control that the vehicle motion control system according to the present embodiment conducts in the driver mode.

In the driver mode, the correction process MIC (s, β) by the ideal motion control unit 44 and the driving process MDC (s, β) by the driver get involved interactively with each other. Not all functional aspects of the driver originally can be described in a uniform manner of handling. Therefore, correcting operations that become deterministically optimal for all drivers do not exist and unnecessarily complicated description has no meaning. An example of minimum requirements of a control algorithm is therefore shown in FIG. 18.

Step S00: Start of processing

Step S01: The longitudinal jerk Jx [i] and lateral jerk Jy [i] of the vehicle are measured. At this time, a longitudinal jerk Jx [i−1] and a lateral jerk Jy [i−1] are compared and whether the jerk is approaching zero is judged.

Step S02: Jerk J [i] (magnitude of the ith jerk vector) is calculated.

Step S03: Longitudinal and lateral component ratios Ix [i] and Jy {i} of the jerk are calculated.

Step S04: The jerk J [i] and a threshold level Igsh are compared.

If J [i]<Igsh, this indicates a steady state and processing returns to step S01.

If J [i]>Igsh, this indicates a start of deceleration or steering and processing advances to step S05.

Step S05: The ith load shift change rate is calculated.

Step S06: Whether the target load shift change rate Kd is set is judged.

If Kd is not set, processing advances to step S07.

If Kd is already set, processing skips to step S10.

Step S07: Longitudinal and lateral component ratios Ix [i] and Iy {i} of the jerk are compared.

If Ix [i]>Iy {i}, processing advances to step S08.

If Ix [i]<Iy {i}, processing skips to step S09.

Step 08: The target load shift change rate Kd is determined from the longitudinal jerk.

Step 09: The target load shift change rate Kd is determined from the lateral jerk.

Step S10: The amount of tire force correction is determined and calculated. The amount of tire force correction is calculated according to a particular difference between the target load shift change rate Kd and the ith load shift change rate.

Step S11: The amount of tire force correction is calculated for distribution. The amount of tire force correction that was determined in step S10 is distributed to an appropriate side slipping angle β and perpendicular slipping rate "s" according to a composition ratio between current longitudinal jerk and lateral jerk. In order to achieve the appropriate correction, the side slipping angle β is corrected according to steering angle and the perpendicular slipping rate "s" is corrected according to braking force. The composition ratio should be changed so that if Ix [i] is larger, the control system will regard the driver as actively controlling the braking force and conduct a correction based only on the steering angle, for example, or so that if Iy [i] is larger, the control system will regard the driver as actively controlling the steering angle and conduct a correction based only on the braking force, for example.

Step S12: A level of arrival at a steady circular turning state is judged from an absolute value of the lateral jerk. At this time, any jerk information obtained as the ith jerk information may be used.

If Jy [i]>Jsth, this indicates that the vehicle is in a slow turning motion. In this case, processing returns to step S01.

If Jy [i]<Jsth, this indicates that the steady circular turn is already reached. In this case, processing advances to step S13.

Step S13: The target load shift change rate Kd is reset and then processing returns to step S01.

A change from braking to cornering is detected from the above and whether the target load shift change rate is to be set from the longitudinal jerk or the lateral jerk is determined.

The amount of tire force correction for correcting the subsequent vehicle behavior is determined and corrections are introduced in the vehicle motion.

When the brake-loosening operation during an initial phase of the turn is completed and the steady circular turn is reached, the target load shift change rate will be reset to zero. The above process is repeated to achieve the ideal motion.

Next, driver assistance control that is "indirect control" in the vehicle motion control system according to the present embodiment is described using FIGS. 19A to 19C. FIGS. 19A to 19C are timing charts showing the driver assistance control that is "indirect control" in the vehicle motion control system according to the present embodiment.

FIG. 19A shows actual longitudinal jerk (Jx) and lateral jerk (Jy). As shown, recommended initiation timing of steering ranges from about 0.3 to 1.1 (s) at which the longitudinal jerk decreases to zero. In the current example, the driver starts steering around 0.8 (s), which stays within the recommended steering initiation timing range. The steady circular turn is reached after an elapsed time of at least 1.8 (s) at which the lateral jerk decreases to zero, and a braking force fine-adjustment timing range is up to this time. In addition, after the lateral jerk has decreased to zero at the time of 1.9 (s) onward, a recommended acceleration initiation timing range follows and in this range, the vehicle can be accelerated at any time. In the current example, however, the vehicle is accelerated after an elapsed time of 2.5 (s).

To present the foregoing recommended timing ranges to the driver, it is necessary to transmit either visual information, audible information, or information indicative of any changes in reaction against the brake pedal, steering, or accelerator pedal operations, or to transmit one or more of the three kinds of information in combination.

FIG. 19B shows "color"-coded presentations as an example of display. These "icons" are presented to the HVI (Human-Vehicle Interface) 55 that transmits the assist information used for "indirect control", and in order to transmit the timing, the icons change in color or turn off. For example, the icon for the brake pedal, marked with B in the figure, usually is initially displayed in "blue" to indicate a braked state, since the brakes are already stepped on from a time of 0 seconds in the present example. After that, when steering is started, the color changes from blue to "yellow" since a need arises to precisely adjust the braking force. The icon turns off after braking has ended.

Similarly, the icon for the steering wheel is initially displayed in "red" to indicate that steering is prohibited, since braking is currently reducing the vehicle velocity and applies negative longitudinal jerk. When steering comes into the recommended steering initiation timing range from that state, the display color of the icon changes to "blue". In the present example, the icon is set so that since steering by the driver is started in the timing of 0.8 (s), the display color changes to "yellow" to suggest "control in coordination with braking". Alternatively, a section around the steering timing range may be of an intermediate color (half-tone). When the coordinative control is completed and the steady circular turn is reached, the display color changes to "blue" and then the icon is turned off so that from the initiation timing of acceleration, the display fades out for a gradual return of the steering wheel.

The icon for the accelerator pedal, marked with A in the figure, remains off for a time up to 1.8 (s) at which the steady circular turn is started. Subsequently, the icon is displayed in blue to indicate that visual transmission of assist information has been started so as to make it possible for the driver to start accelerating within the range of the steady circular turn, that is, within a zero lateral jerk range.

In this manner, the colors of the icons are presented to the driver via the HVI 55. Support information for determining the initiation timing of steering, the termination timing of the brake-loosening operation, and the initiation timing of accelerating, from the respective "recommended ranges", can be assigned visually. This makes it possible to implement the "indirect control" function of the present invention.

FIG. 19C shows a concept of presenting support information based on reactions or on alarms issued from the HVI 55. Once the vehicle has entered the deceleration operation, a reaction of the brake pedal becomes constant. Around or after the elapsed time of 0.8 (s) at which the steering operation is started, deceleration needs to be lessened. In FIG. 19C, the control system aims at reducing the pedaling force of the driver by increasing the reaction of the pedal (this operation is called the push-back operation).

For a reaction of the steering wheel, the control system is constructed to prompt a start of steering by adding a torque. In addition, a fluctuation component may be superimposed upon this torque to generate a "tactile signal". Alternatively, the start of steering can be prompted by changing a frequency and amplitude of this signal with a passage of time.

In regards to a reaction of the accelerator pedal, when the steady circular turn is reached, a tactile signal may also be applied to prompt the driver to start accelerating in the recommended acceleration initiation timing range. In addition, similarly to the presentation of support information based on this reaction, an interval signal indicative of a sound level, frequency, or information-transmitting sound level equivalent to a reaction command, may be "changed" by the HVI 55. The support information for determining the initiation timing of steering, the termination timing of the brake-loosening operation, and the initiation timing of accelerating, from the respective "recommended ranges", can be assigned visually. This makes it possible to implement the "indirect control" function of the present embodiment.

The "indirect control" function of the present embodiment allows the driver to receive the presentation of timing while feeling the jerk that is body-sensory information. In other words, the driver can obtain an "input" that is the jerk, and the correct timing, namely, a "teaching signal". This means that so-called "supervisory learning" discussed as a method of learning a neural network is possible. According to the present invention, a new system can be constructed that provides the driver with insight and suggestions on driving operations and prevents degradation of his or her driving capabilities due to control dependence.

Aspects of the present invention relating to a method and apparatus for conducting automatic control of steering, braking, and acceleration operations, based on longitudinal and lateral jerk information, or to an apparatus for presenting optimal timing to a driver and assisting the driver in optimizing vehicle motion control have been disclosed in the present embodiment. Information that is important during actual control is the vertical wheel load change rates of each tire, shown in FIGS. 11A-11H and 14. These change rates are a linear coupling of the results derived by multiplying longitudinal jerk and lateral jerk by a fixed value determined from the vehicle specifications and performance characteristics data. Therefore, after direct measurement of vertical loads for each wheel, for example, if the vertical loads of the front wheels are maximal, assist information for the start of steering may be presented or control may be conducted for constant increase rates of the vertical loads of the outer wheels during a turn. At present, since the load meters that handle large loads accurately are expensive, the present embodiment uses detected longitudinal and lateral jerk for control and assistance. Therefore, using some method to measure loads or the physical quantities that reflect the loads (e.g., a spring displacement of a suspension system) makes it possible to conduct control or driver assistance in timing equivalent to that described in the present embodiment, or in accordance with control targets, and such control and control systems fall within the scope of the present invention.

In addition, even if the terms that express detecting an acceleration level and detecting its maximum value as well are not explicitly used, these detecting operations are equivalent to detecting eventually the timing in which jerk becomes zero, and starting the control of steering, braking, and driving, in this timing, is within the scope of the present invention.

The fact that the timing of steering, braking, or driving matches the timing in which longitudinal or lateral jerk becomes zero has been described in the present embodiment. However, entry of noise into not only jerk signals, but also all other signals, is unavoidable and "neighborhood of zero jerk" in the appended claims also means signals with entrapped noise components.

Finally, academic placement of the present invention is described below. In the invention, control is conducted so as to obtain a constant change rate K of vertical loads. Under the concept of the calculus of variations, obtaining the constant change rate K of vertical loads is, as a matter of fact, equivalent to applying the following proposition:

"When $\Delta W1$ is to be changed within a period of "tf" in FIG. 5C, those changes in acceleration are achieved that minimize an integral value (J) of the mean-square of longitudinal jerk and lateral jerk over the period "tf""

$$J=\int_0^{tf}(J_x^2+J_y^2)dt \quad (24)$$

Meanwhile, that the trajectories of human arm movements are planned for minimum jerk is described in "T. Flash, N. Hogan: The Coordination of Arm Movements—An Experimentally Confirmed Mathematical Model, Journal of Neuroscience, Vol. 5, No. 7, pp. 1688-1703 (1985)".

It is a new discovery that in a "vehicle that a human is driving", movements of the "vehicle" are also controlled to minimize a jerk thereof.

Control is conducted so as to obtain a minimum mean-square of the longitudinal jerk and the lateral jerk, so this means that even for the steering control intended exclusively for lateral control, longitudinal jerk information is required, and that even for the deceleration or acceleration control intended exclusively for longitudinal control, longitudinal jerk information is required.

As set forth above, according to the present embodiment, the first object of the present invention, that is, defining clear guidelines on more specific control timing associated with accelerating, steering, and braking operations, and providing a motion control system based on the defined guidelines, is achieved. In addition, the second object of the present invention, that is, providing a system that presents detailed control guidelines simultaneously with the above guidelines to the driver and thus allows the driver to obtain guidelines with respect to his or her own driving operations, is achieved.

Excepting air resistance, the kinds of force that control the movements of the vehicle are confined to the force applied from the ground surface to the vehicle-mounted tires by relative movements of the tires and the ground surface. In addition, the vehicle conducts a movement by means of the force, and this movement applies a new force to the vehicle. Compound events in which a cause and a result are repeated in rapid sequence are formed in this fashion.

In order for the driver in the vehicle to control such a movement of the vehicle, the tires must implement the movement by means of the force applied from the ground surface (hereinafter, this force is called the tire force), and control must be conducted so that the tire force generated by the particular movement for the first time will be appropriate for achieving the movement desired. If these relationships are not satisfied, this will break down the movement or the tires. For example, the front wheels will be braked under a straight-traveling state and the rear wheels will remain driven. In addition, if a load shift causes an inappropriate balance between the forces that the front wheels and the rear wheels generate during a turn, the vehicle will drift out, spin, or conduct other inappropriate movements.

It is difficult to derive the motion control method best suited for all vehicles. However, if situations are limited to, for example, a start of a turn from deceleration or a start of linear accelerating from a turn, the following appropriate control methods that are valuable in terms of engineering can be discovered.

That is to say, in order to achieve the first and second objects of the present invention, a vehicle motion control system according to an aspect of the present invention includes a device constructed to control steering of a vehicle (and the device further has an element for detecting at least a longitudinal jerk of the vehicle), and uses at least longitudinal jerk information of the vehicle to control the steering thereof. More specifically, when the vehicle is steered concurrently with deceleration, control is conducted such that steering is started during a period of time that the longitudinal jerk value stays in neighborhood of zero. In addition, the above vehicle motion control system of the present invention includes an automatic steering mechanism independent of a driver, and controls steering initiation timing of the automatic steering mechanism. Furthermore, the above vehicle motion control system of the present invention has an element for presenting information useful for the driver to determine initiation timing of steering, and is constructed such that the driver controls the initiation timing of steering, and such that the information-presenting element presents at least one of three kinds of information, that is, visual information, audible information, or torque inputs to a steering device.

A vehicle motion control system according to another aspect of the present invention includes a device constructed to control deceleration and acceleration of a vehicle (and the device further has an element for detecting at least a lateral jerk of the vehicle), and uses at least lateral jerk information of the vehicle to control the deceleration and acceleration thereof. More specifically, when steering is underway concurrently with deceleration, the deceleration is terminated during a period of time that the lateral jerk value stays in neighborhood of zero. In addition, the above vehicle motion control system of the present invention includes an automatic decelerating mechanism independent of a driver, and controls termination timing of the deceleration. Furthermore, the above vehicle motion control system of the present invention has an element for presenting information useful for the driver to determine timing in which the deceleration is to be stopped, and is constructed such that the driver controls the timing in which the deceleration is to be stopped, and such that the information-presenting element presents at least one of three kinds of information, that is, visual information, audible information, or reaction inputs to a brake pedal and other decelerating devices.

Besides, when steering is underway, control is conducted such that acceleration is started during a period of time that at least the lateral jerk value stays in the neighborhood of zero. In addition, the above vehicle motion control system of the present invention includes an automatic accelerating mechanism independent of the driver, and controls initiation timing of acceleration. Furthermore, the above vehicle motion control system of the present invention has an element for presenting information useful for the driver to determine the initiation timing of acceleration, and is constructed such that the driver controls the initiation timing of acceleration and such that the information-presenting element presents at least one of three kinds of information, that is, visual information, audible information, or reaction inputs to an accelerator pedal and other accelerating devices.

What is claimed is:

1. A vehicle motion control system having a device adapted to control steering of a vehicle, the control system further comprising at least control means for controlling the steering of the vehicle by using at least longitudinal jerk information of the vehicle,
    wherein said control means conducts control such that steering is started during a period of time that a longitudinal jerk value is in a neighborhood of zero.

2. The vehicle motion control system according to claim 1, further comprising an automatic steering mechanism independent of a driver,
    wherein said control means controls steering initiation timing of said automatic steering mechanism.

3. The vehicle motion control system according to claim 1, further comprising information presenting means for presenting information for determining initiation timing of steering to a driver,
    wherein timing in which the driver starts steering is controlled in accordance with the information presented from said information-presenting means.

4. The vehicle motion control system according to claim 3, wherein
    said information-presenting means presents at least one of three kinds of information, that is, visual information, audible information, or torque inputs to a steering device.

* * * * *